(12) United States Patent
Hughes et al.

(10) Patent No.: US 10,323,676 B2
(45) Date of Patent: *Jun. 18, 2019

(54) LOCKING NUT

(71) Applicants: MacLean-Fogg Company, Mundelein, IL (US); Stemco Products, Inc., Charlotte, NC (US)

(72) Inventors: Mark W. Hughes, Fulton, IL (US); Daniel T. Jimenez, Diana, TX (US)

(73) Assignees: MacLean-Fogg Company, Mundelein, IL (US); Stemco Products, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/623,882

(22) Filed: Jun. 15, 2017

(65) Prior Publication Data

US 2017/0284451 A1 Oct. 5, 2017

Related U.S. Application Data

(63) Continuation of application No. 14/341,060, filed on Jul. 25, 2014, now Pat. No. 9,683,596.

(60) Provisional application No. 61/858,847, filed on Jul. 26, 2013.

(51) Int. Cl.
*F16B 37/12* (2006.01)
*F16B 39/26* (2006.01)

(52) U.S. Cl.
CPC .................................. *F16B 39/26* (2013.01)

(58) Field of Classification Search
CPC .......................................................... F16B 39/26
USPC ....................................................... 411/262
See application file for complete search history.

(56) References Cited

U.S. PATENT DOCUMENTS

| | | | |
|---|---|---|---|
| 292,513 A | 1/1884 | Shailer | |
| 588,346 A | 8/1897 | Mireault | |
| 1,212,033 A * | 1/1917 | Ensign | F16B 39/32 411/198 |
| 1,287,270 A * | 12/1918 | Ensign | F16B 39/32 411/198 |
| 1,297,845 A | 3/1919 | Hawrylasz | |
| 3,762,455 A | 10/1973 | Anderson, Jr. | |
| 3,844,323 A | 10/1974 | Anderson, Jr. | |
| 3,942,570 A * | 3/1976 | Bochman, Jr. | F16B 39/10 285/81 |
| 4,812,094 A | 3/1989 | Grube | |
| 4,913,564 A * | 4/1990 | Stephan | F16C 19/16 384/511 |
| 4,971,501 A * | 11/1990 | Chavez | F16B 39/32 411/221 |
| 5,180,265 A | 1/1993 | Wiese | |
| 5,533,849 A * | 7/1996 | Burdick | F16B 39/282 411/120 |
| 5,597,278 A | 1/1997 | Peterkort | |
| 6,290,442 B1 | 9/2001 | Peterkort | |
| 7,029,218 B2 | 4/2006 | Peterkort | |

(Continued)

*Primary Examiner* — Gary W Estremsky
(74) *Attorney, Agent, or Firm* — Perkins Coie LLP

(57) ABSTRACT

A nut fastener is provided for locking the nut to prevent inadvertent loosening of the nut. The nut fastener is particularly useful for tightening a wheel onto an axle. The nut fastener includes a nut, a collar and a retaining ring. The nut is unlocked by pushing on an engagement surface of the collar or by riding ratchet teeth over each other. When the collar is released, the collar locks against the nut to resist rotation of the nut.

18 Claims, 21 Drawing Sheets

(56) References Cited

U.S. PATENT DOCUMENTS

| | | |
|---|---|---|
| 8,011,866 B2 | 9/2011 | Harris |
| 8,459,919 B2 | 6/2013 | Ehrler et al. |
| 8,540,470 B2 | 9/2013 | Dillon et al. |
| 2011/0188970 A1* | 8/2011 | Dillon .................... F16B 39/12 411/433 |

* cited by examiner

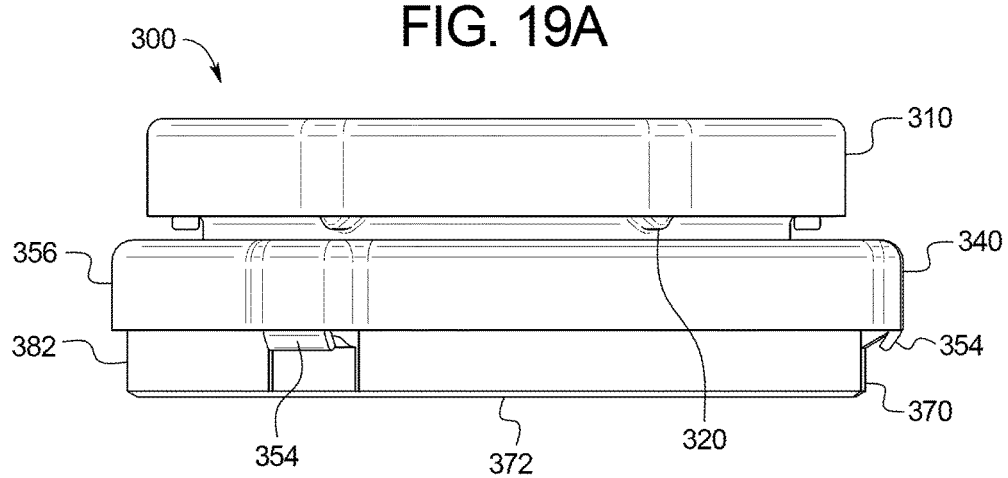
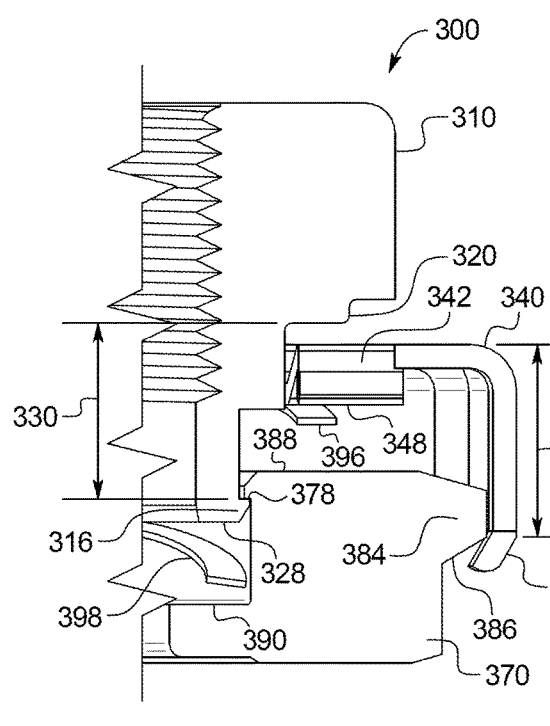
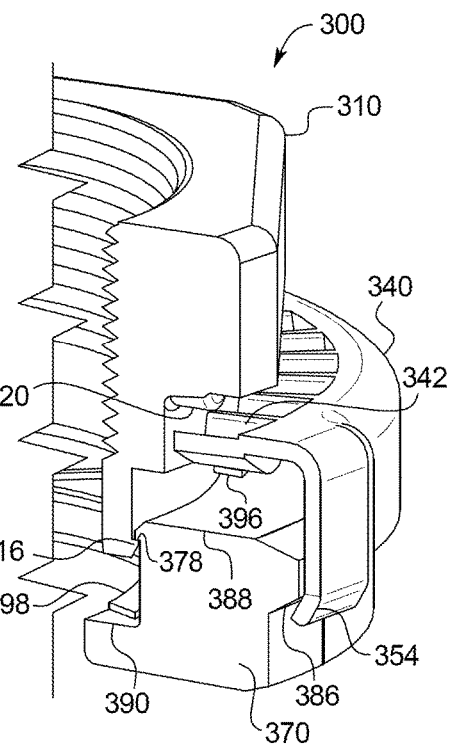

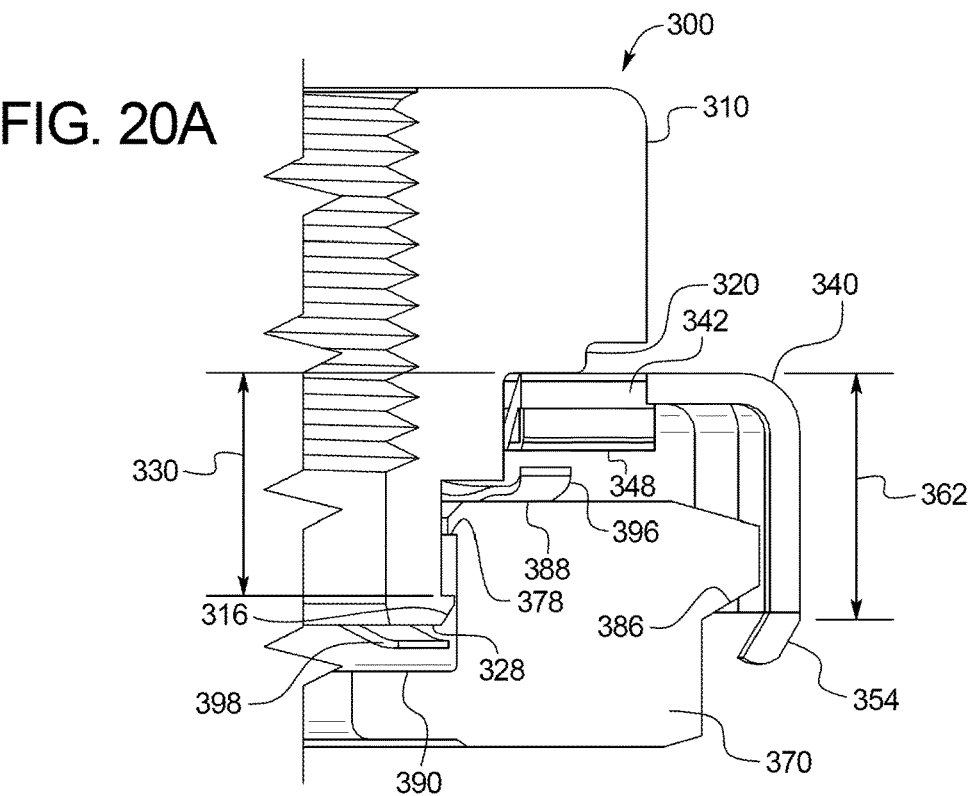
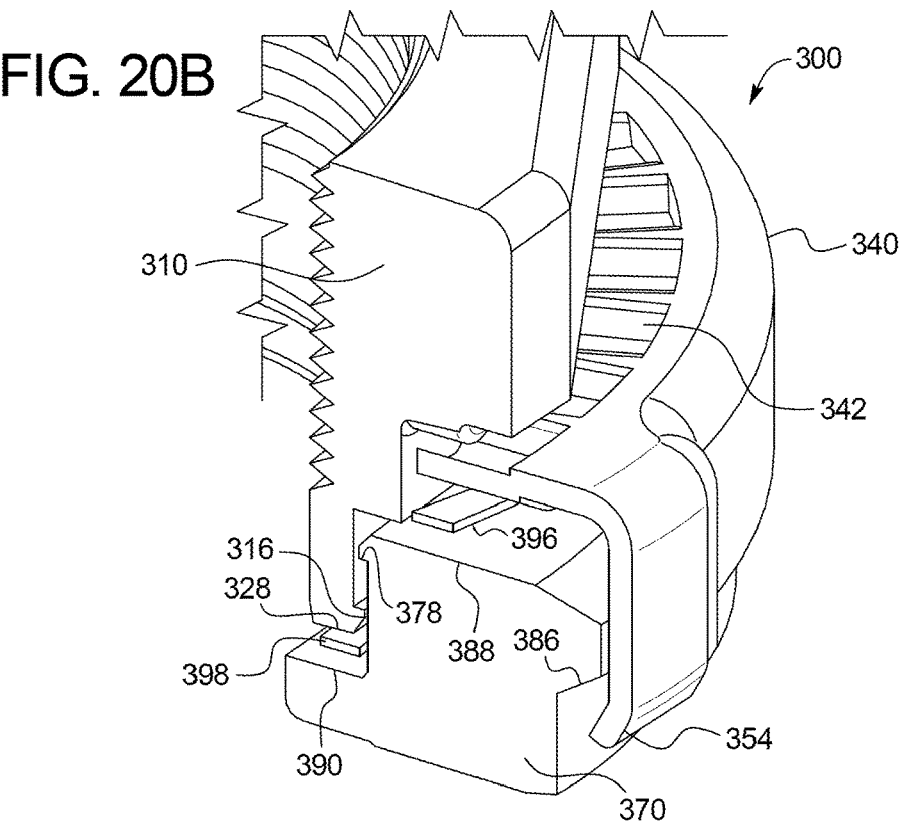

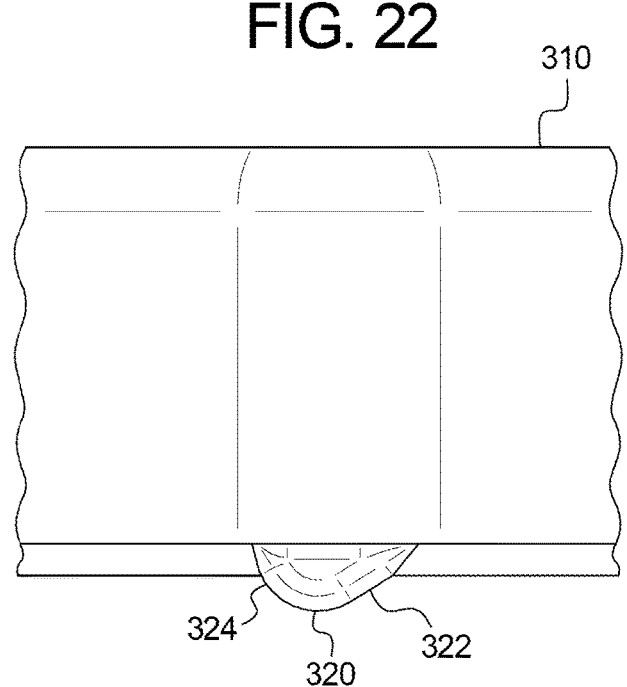
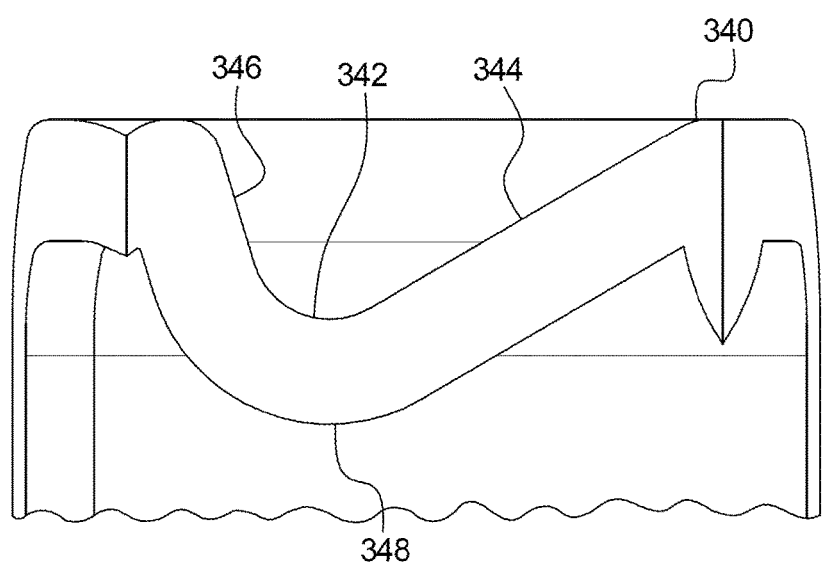

LOCKING NUT

This application is a continuation of U.S. application Ser. No. 14/341,060, filed Jul. 25, 2014, the entire disclosure of which is hereby incorporated by reference. U.S. application Ser. No. 14/341,060 claims priority to U.S. Provisional Application No. 61/858,847, filed Jul. 26, 2013, which is hereby incorporated by reference herein.

BACKGROUND

The present invention relates generally to internally threaded nuts and more particularly to a nut that can be locked to prevent the nut from loosening.

Nuts are known as a versatile component for fastening many different types of parts together. Fundamentally, a nut typically includes inner threads that are designed to engage corresponding external threads on a shaft. The nut further includes wrench bearing surfaces for rotating the nut with a tool. Accordingly, by rotating the nut, or by rotating the shaft and preventing the nut from rotating, the nut can be tightened or loosened on the shaft. Nuts are also typically provided with a pressure surface to apply longitudinal force to an apparatus.

One problem with conventional nuts is that they may inadvertently loosen during use. This commonly occurs when the apparatus that the nut is attached to experiences vibrations during use of the apparatus. Vibrations occur for numerous reasons and usually cannot be controlled by the designer, manufacturer or operator of an apparatus. For example, vibrations can be caused by internal forces necessary for the apparatus to function, such as an internal combustion engine or electric motor, or can be caused by external forces during use of the apparatus, such as a vehicle bouncing up and down as it travels over road. Vibrations can cause a nut to spontaneously loosen by causing fluctuations in the tension of the threaded engagement between the nut and the shaft. Because a nut requires more torque to tighten it than to loosen it, the nut seeks a lower tension state by spontaneously loosening when there is sufficient vibration to allow the nut to overcome whatever resistance there may be to loosening.

Various systems have been designed to prevent nuts from loosening after being initially tightened. A common way to address this problem is to increase the friction that the nut must overcome before loosening. One of the simplest approaches to increase friction is to provide the nut with a large pressure face that contacts the apparatus and applies longitudinal force to the apparatus. By increasing the size of the pressure face, the friction between the nut and the apparatus increases, and because the nut must overcome this friction to loosen, the nut is more resistant to loosening. Friction can be increased even further by providing protrusions on the pressure face that dig into the apparatus when the nut is tightened. Another way to reduce loosening of nuts is to add an expandable washer between the pressure face of the nut and the apparatus. Expandable washers absorb some of the fluctuations in tension of the fastener engagement so that the tension on the nut is more uniform. Thus, the nut is somewhat isolated from the vibrations and does not experience the full fluctuations in tension that it normally would experience. Another way to reduce loosening of nuts is to apply an adhesive or other material between the threads of a nut and the shaft. Depending on the type of material used, the result can be to essentially glue the nut and the shaft together to prevent relative movement or to increase the friction that the nut must overcome to loosen.

One problem with many solutions to nut loosening is that the nut can still loosen if enough vibrations occur to overcome the increased resistance to loosening. In other words, many approaches rely on increasing the resistance to loosening but do not provide a positive locking feature. Another problem with many solutions is that they also increase the amount of torque required to tighten the nut. This is a particular problem in applications where a precise amount of torque is required on the fastener to achieve a specified longitudinal force on the apparatus. Many solutions are not desirable in this type of application because the increased torque caused by a washer, adhesive or other friction enhancement feature is unpredictable and makes it difficult to achieve the precise longitudinal force that is required.

One particularly demanding application for nuts is axle nuts that attach the wheel hub of a vehicle to the axle. Foremost, axle nuts are a critical safety component in a vehicle because if an axle nut loosens, the wheel hub will first begin to wobble erratically and make it difficult to control the vehicle, and if the axle nut fully loosens, the wheel hub will fall off the vehicle, making control even more problematic. Another concern involving axle nuts is that the longitudinal force applied by the nut to the apparatus is typically used to preload the wheel bearings. The preload that is applied to the wheel bearings is required to be within a narrow tolerance to ensure that the bearings rotate properly and do not wear out prematurely. As a result, the torque that is applied to the axle nut must be reliably translated into longitudinal force without the unpredictability of other friction enhancement designs. Another concern is that extreme amounts of torque are applied to axle nuts since a single nut is usually used to fasten the wheel to a vehicle. Thus, the axle nut must be robust and any locking feature must also be sufficiently robust. In other wheel hub applications, the bearings may require a specified end play instead of preload. While this application does not require the higher torque settings that preloaded bearings typically require, precise setting and retention of the end play is still a critical function of the axle nut.

Accordingly, the inventor believes it would be desirable to provide an improved locking nut.

SUMMARY

A nut fastener is described for locking a nut. The nut fastener is provided with a retaining ring, a collar, a spring, and a nut. The retaining ring is rotationally fixed to a threaded shaft. The collar is rotationally fixed to the retaining ring. The nut is rotationally fixed to the collar when the spring biases the collar away from the retaining ring. When the collar is pushed toward the retaining ring to compress the spring, the nut becomes unlocked and can rotate relative to the collar, retaining ring and the threaded shaft. Additional details and advantages are described below in the detailed description.

The invention may include any of the following aspects in various combinations and may also include any other aspect described below in the written description or in the attached drawings.

BRIEF DESCRIPTION OF SEVERAL VIEWS OF THE DRAWINGS

The invention may be more fully understood by reading the following description in conjunction with the drawings, in which:

FIGS. 19A-19D are views of the nut fastener, showing an initial position with a free spinning region;

FIGS. 20A-20B are views of the nut fastener, showing an intermediate position with the ratchet teeth at least partially engaged;

FIG. 22 is an enlarged view of a ratchet tooth on the nut;

FIG. 23 is an enlarged view of a ratchet tooth on the collar;

DETAILED DESCRIPTION

Figure 6:
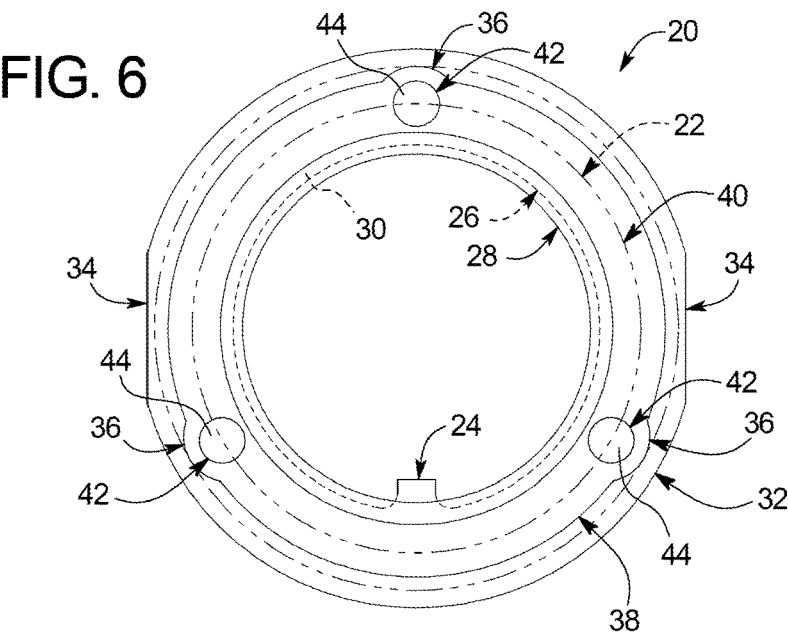
FIG. 6 is a top plan view of a retaining ring.
Figure 8:
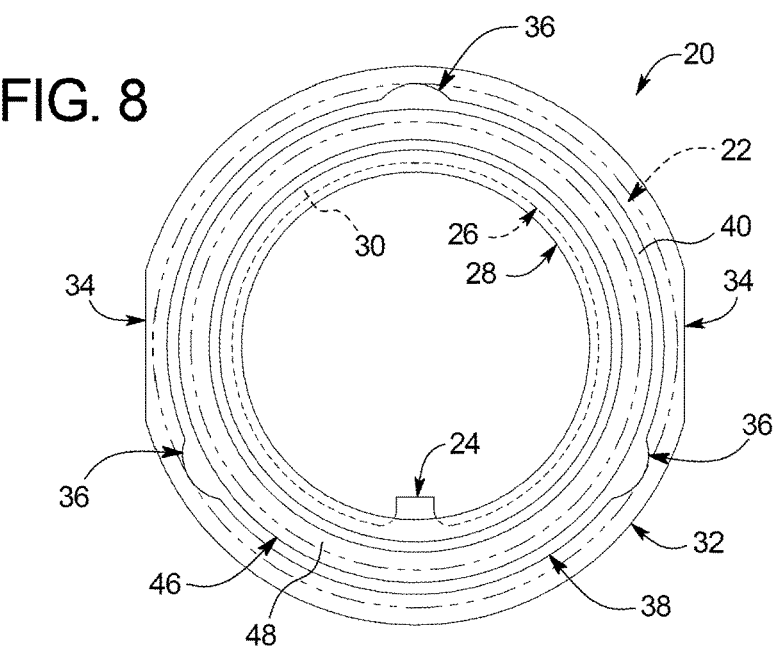
FIG. 8 is a top plan view of another embodiment of a retaining ring.

Referring now to the figures, a nut fastener 10 is shown. The nut fastener 10 may include a retaining ring 20, a collar 50, a nut 70, and a spring 90, 92. The retaining ring 20 is shown by itself in FIGS. 6 and 8 and in cross-section in FIGS. 2-3. The retaining ring 20 includes a pressure surface 22 that is designed to contact an apparatus that the nut fastener 10 is attached to and apply longitudinal force from the nut fastener 10 to the apparatus. The retaining ring 20 also includes an inner tab 24, or first rotational retaining member 24, that is designed to engage with a slot in a threaded shaft to prevent rotation between the retaining ring 20 and the shaft. The inner diameter 26 of the retaining ring 20 adjacent the pressure surface 22 provides clearance for the threaded shaft and for the retaining member 78 of the nut 70. A first longitudinal retaining surface 28, or member 28, may be provided adjacent the inner diameter 26. The first longitudinal retaining surface 28 may be angled so that it is facing the pressure surface 22. A first torque bearing surface 30 may be provided adjacent the first longitudinal retaining surface 28. The first torque bearing surface 30 may be angled so that it is facing away from the pressure surface 22. The outer diameter 32 of the retaining ring 20 may be slightly larger than the outer diameter of the collar 50 so that the outer diameter 32 of the retaining ring 20 is the largest diameter of the nut fastener 10. The outer diameter 32 may also be provided with opposing flat sides 34 that are spaced apart approximately the same width as the outer diameter of the collar 50. The opposing flat sides 34 may be useful for retaining the retaining ring 20 with a tool to prevent rotation of the retaining ring 20. The retaining ring 20 is also provided with three tabs 36, or second rotational retaining members 36, that extend away from the axis of the fastener 10 and are equally spaced around the outer circumference of the retaining ring 20. As shown in FIGS. 6 and 8, the flat sides 34 may be oriented away from the outer tabs 36 in order to reduce the profile of the nut fastener 10. The retaining ring 20 may also be provided with a first slide surface 38 around the outer circumference of the retaining ring 20 inward from the outer diameter 32 of the retaining ring 20. A fourth stop surface 40 may be provided on an opposite side of the retaining ring 20 from the pressure surface 22. As shown, in FIG. 6, the retaining ring 20 may be provided with three spring pockets 42 equally spaced around the retaining ring 20. The bottom surface 44 of each of the spring pockets 42 may be a first spring abutment surface 44. Preferably, each of the spring pockets 42 is located at one of the outer tabs 36 so that the outer surfaces of the tabs 36 wrap around the spring pockets 42. As shown in FIG. 8, the retaining ring 20 may alternatively be provided with a groove 46 in the fourth stop surface 40 so that the bottom 48 of the groove 46 may be a first spring abutment surface 48 in the form of a ring around the axis of the fastener 10.

Figure 1:
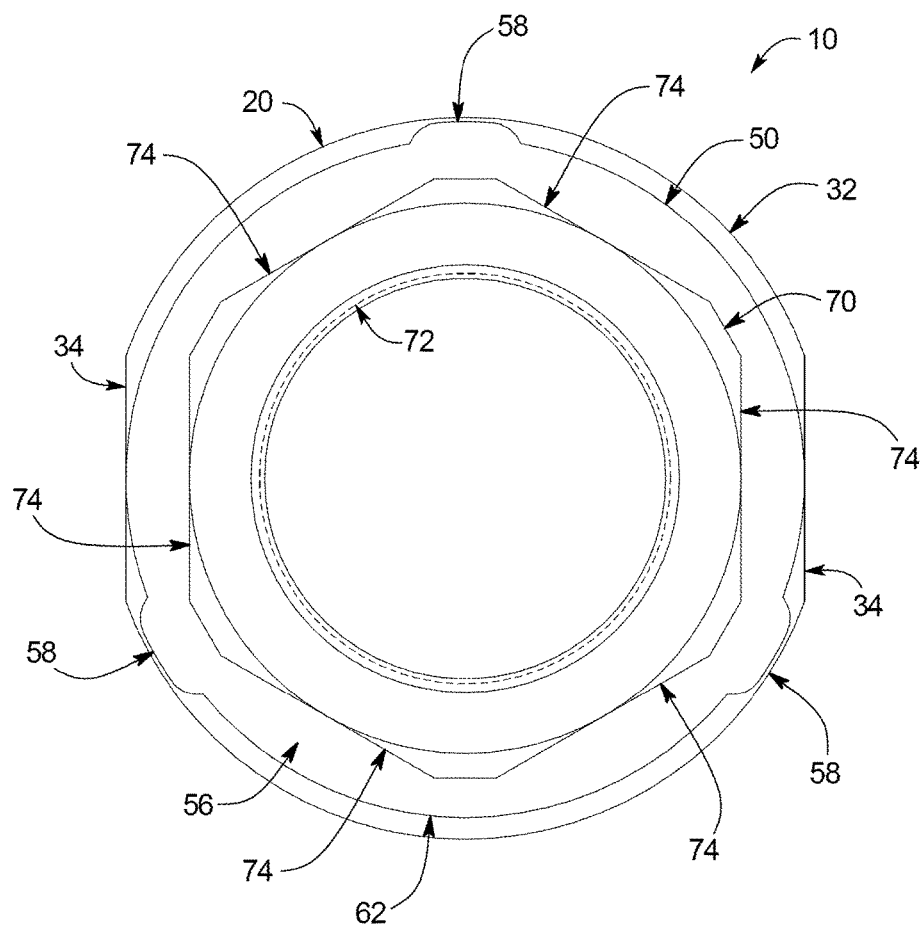
FIG. 1 is a top plan view of a nut fastener.
Figure 2:
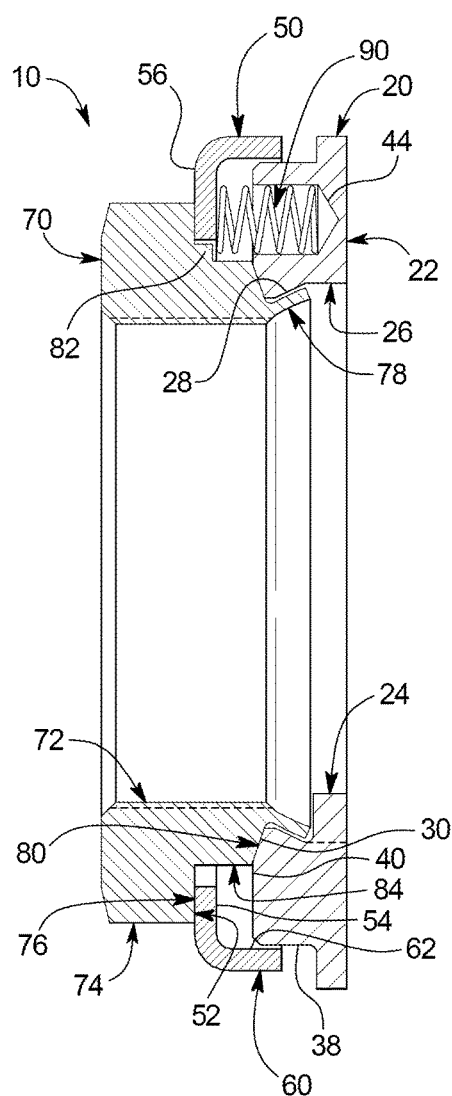
FIG. 2 is a side cross-sectional view of the nut fastener in a locked position.
Figure 3:
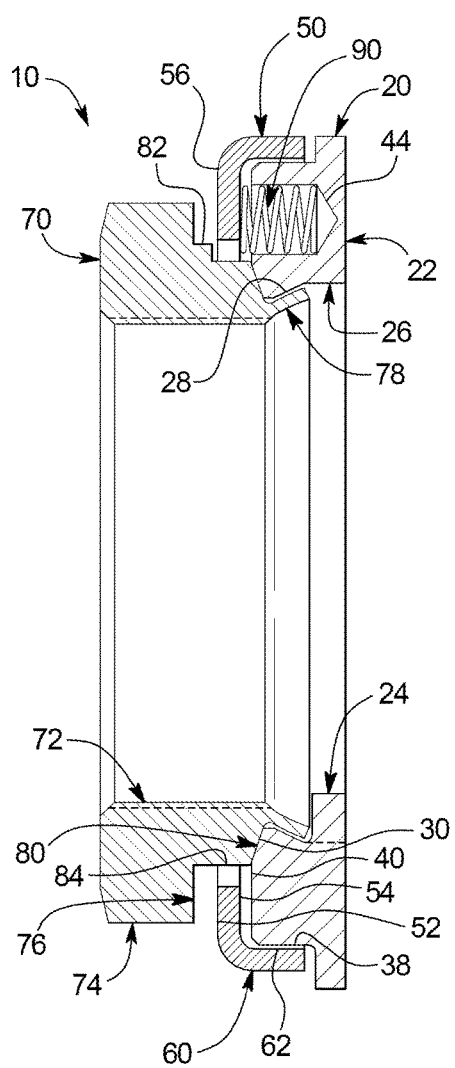
FIG. 3 is a side cross-sectional view of the nut fastener in an unlocked position.
Figure 5:
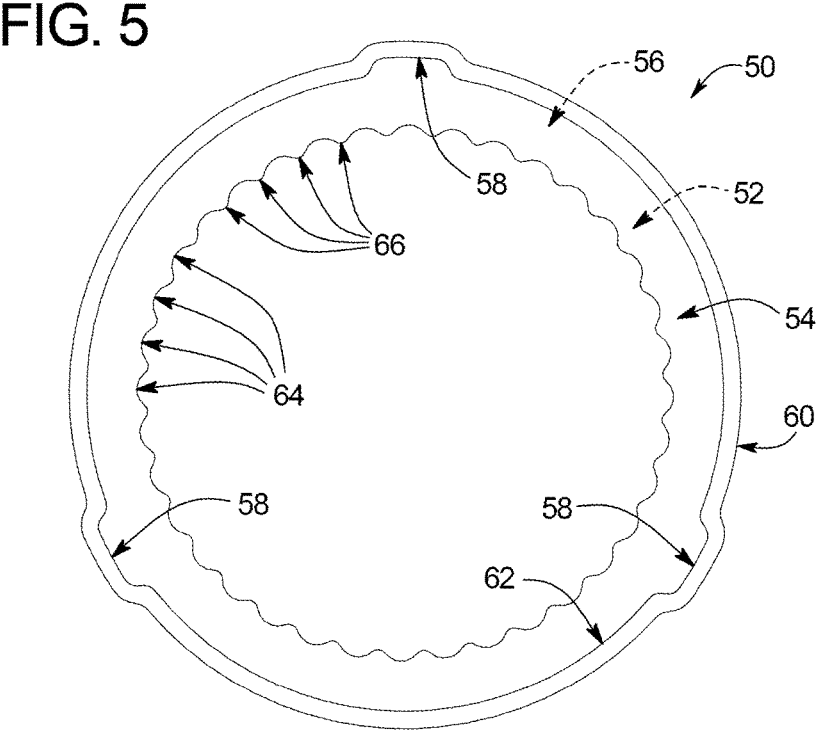
FIG. 5 is a bottom plan view of a collar.

The collar 50 is shown by itself in FIG. 5 and in cross-section in FIGS. 2-3. The collar 50 is preferably formed as a stamping from a plate so that the thickness of the collar 50 is generally uniform throughout. The collar 50 is provided with a first stop surface 52 and a third stop surface 54 that are disposed on opposite sides of the collar 50. The collar 50 may also be provided with an engagement surface 56 that extends outward from the wrench bearing surfaces 74 when the nut fastener 10 is assembled. Preferably, the engagement surface 56 and the first stop surface 52 are flush with each other. The collar 50 may also be provided with a second spring abutment surface 54, which may be the same surface 54 as the third stop surface 54. The outer circumference of the collar 50 may be provided with three first recesses 58, or third rotational retaining members 58, that receive the retaining ring tabs 36. The first recesses 58 may be formed by bending a portion 60 of the collar 50 so that the outer diameter of the bent portion 60 extends longitudinally along the nut fastener 10. The inner surface 62 of the bent portion 60 may provide a second slide surface 62 that guides the collar 50 along the retaining ring 20. The inner circumference of the collar 50 may be provided with a plurality of second recesses 64, or fourth rotational retaining members 64. The inner circumference 66 of the collar 50 may form a third slide surface 66 that slides along the fourth slide surface 84 of the nut 70.

Figure 4:
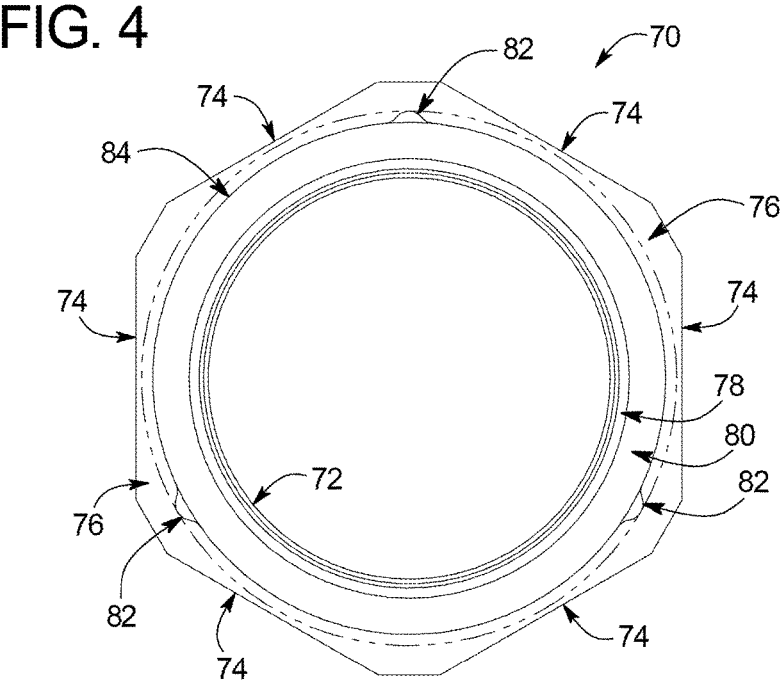
FIG. 4 is a bottom plan view of a nut.

The nut 70 is shown by itself in FIG. 4 and in cross-section in FIGS. 2-3. The nut 70 includes inner threads 72 that are designed to engage with external threads of a shaft. The nut 70 also includes wrench bearing surfaces 74 that are designed to be engaged by a tool to rotate the nut 70. A second stop surface 76 may be provided at the bottom of the wrench bearing surfaces 74. The nut 70 may be provided with a flared portion 78, or second longitudinal retaining member 78. Although the flared portion 78 may be formed and shaped in various ways, one desirable way to make the flared portion 78 is to initially form the flared portion 78 as a straight extension of the nut 70. During assembly, the straight extension may be inserted through the retaining ring 20 and the straight extension can be swaged to form the flared portion 78. The nut 70 may also be provided with a second torque bearing surface 80 that corresponds to the first torque bearing surface 30 of the retaining ring 20. Around the outer circumference, the nut 70 may be provided with three tabs 82, or fifth rotational retaining members 82, that extend outward from the axis of the fastener 10. The tabs 82 may extend outward from a fourth slide surface 84 and away from the second stop surface 76 toward the pressure surface 22 of the retaining ring 20. The tabs 80 extend only along a portion of the fourth slide surface 84 so that the collar 50 can disengage from the tabs 82 as described further below.

Figure 7:
FIG. 7 is a side perspective view of a wave spring.

The springs 90, 92 may be either coil springs 90 as shown in FIGS. 2-3 or may be a circular or wave spring 92 as shown in FIG. 7. If coil springs 90 are used, it is preferable to provide spring pockets 42 in the retaining ring 20 as shown in FIGS. 2-3 and 6. On the other hand, if a circular spring 92 is used, a groove 46 in the retaining ring 20 as shown in FIG. 8 is preferred.

Figure 9:
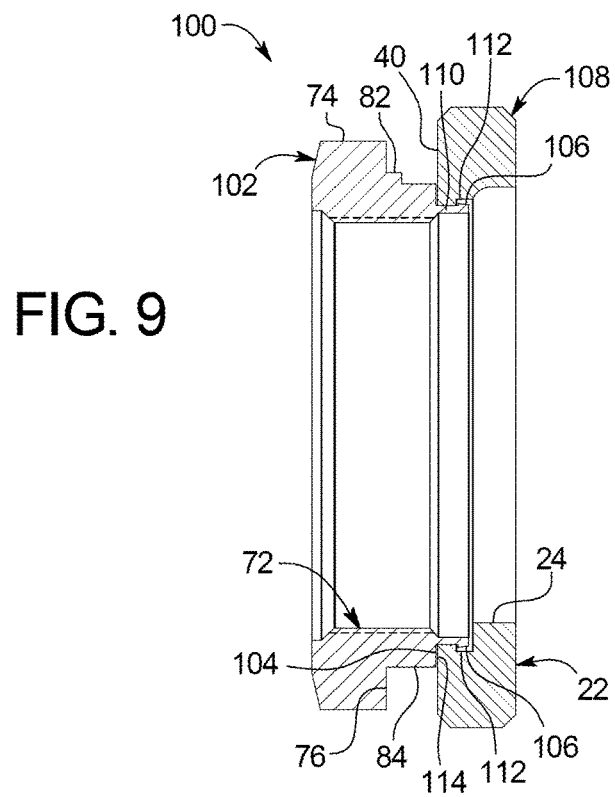
FIG. 9 is a side cross-sectional view of another embodiment of a nut fastener.

In another embodiment of the nut fastener 100, as shown in FIG. 9, the second longitudinal retaining member 106 may be a bead 106 that is machined onto the nut 102. The retaining ring 108 may be provided with an inner diameter 110 that is smaller than the diameter of the nut bead 106. In order to assemble this arrangement of the nut fastener 100, the nut bead 106 may be pressed through the inner diameter 110 of the retaining ring 108 until the nut bead 106 passes through the inner diameter 110 and is received by an undercut groove 112 that is larger in diameter than the nut bead 106. To aid assembly, the inner diameter 110 of the retaining ring 108 and the nut bead 106 may be provided with chamfers. As also shown, the first and second torque bearing surfaces 114, 104 may be flat and orthogonal to the axis instead of being angled. Although not shown in FIG. 9, a collar 50 and wave spring 92 as described above may be adapted to this particular arrangement of the nut fastener 100.

Figure 10:
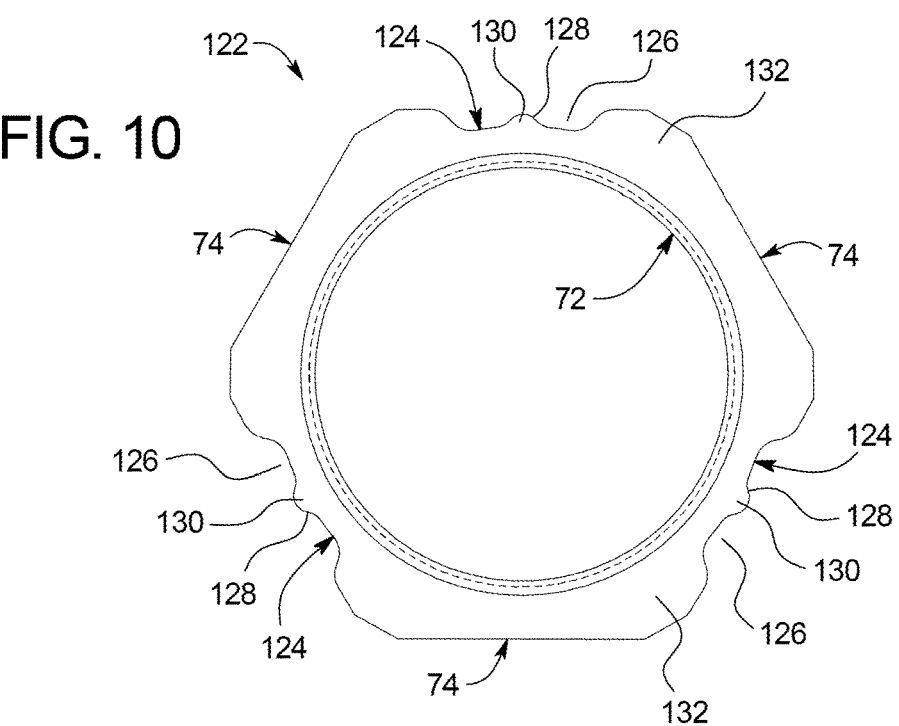
FIG. 10 is a top plan view of another embodiment of a nut.
Figure 11:
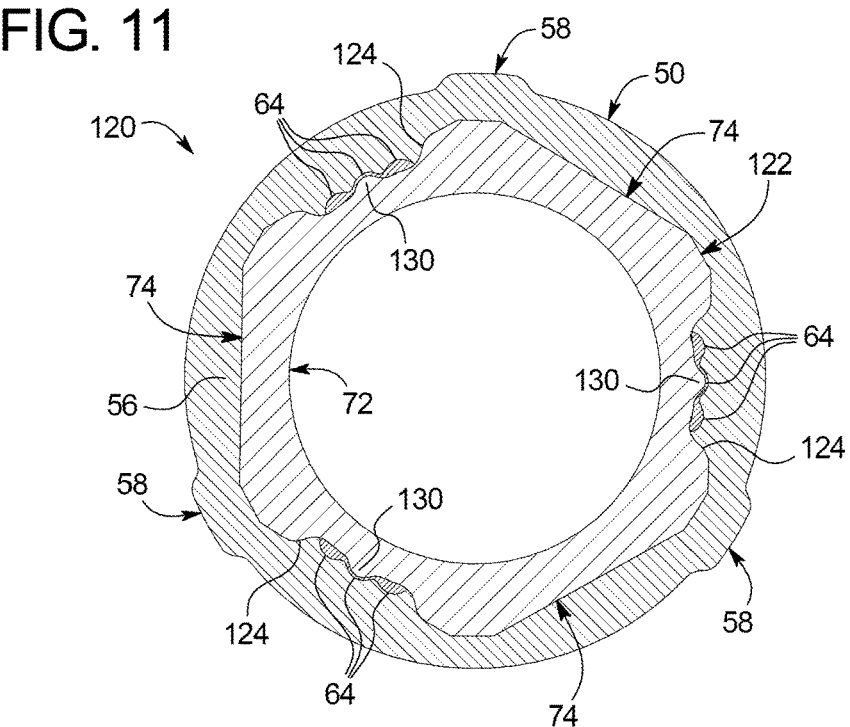
FIG. 11 is a top plan view of another embodiment of a nut fastener.
Figure 12:
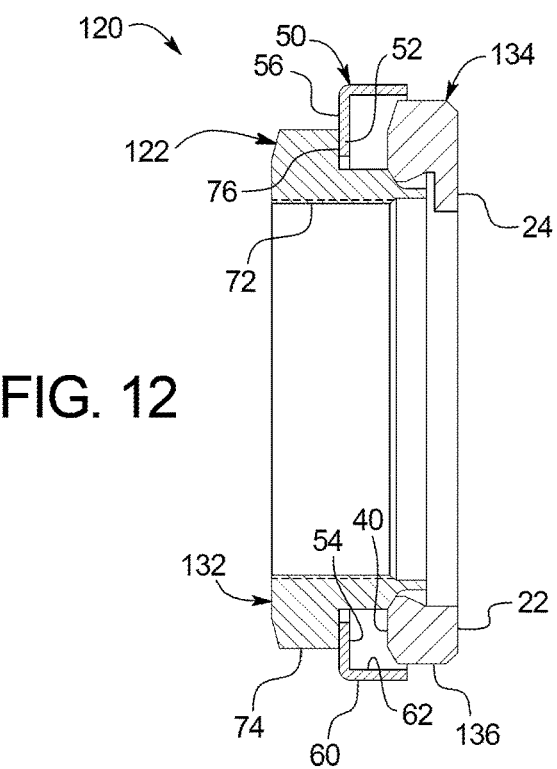
FIG. 12 is a side cross-sectional view of the nut fastener of FIG. 11.

Turning the FIGS. 10-12, another embodiment of the nut fastener 120 is shown. The nut 122 is shown by itself in FIG. 10 and assembled in the nut fastener 120 in FIGS. 11-12. As shown, one or more of the wrench bearing surfaces 124 may include a recessed area 126 that exposes the end 130 of the nut tab 128 that faces toward the wrench bearing surfaces 74, 126. If desired, the tabs 128 may extend through the recessed areas 126 and past the second stop surface 76. The ends 130 of the tabs 128 may also be flush with the top surface 132 of the nut 122 and the wrench bearing surfaces 74, 126. As shown in FIG. 11, one advantage of this arrangement of the nut fastener 120 is that the nut tabs 128 are visible from the top of the nut fastener 120. The second collar recesses 64 that are positioned within the recessed area 126 are also visible from the top of the nut fastener 120. As a result, the operator can visually verify that the nut tabs 128 are solidly locked in the second collar recesses 64 when tightening the nut fastener 120.

As shown in FIG. 12, the collar 50 may have a uniform thickness throughout and may be formed by stamping a plate. The collar 50 may have a bent portion 60 that extends longitudinally away from the first stop surface 52 and toward the retaining ring 134. As shown, the inner surface 62 of the bent portion 60 may fully encompass the entire outer circumference 136 of the retaining ring 134. The retaining ring 134 may also be formed without any portion extending out from the inner surface 62 of the bent portion 60 of the collar 50. As a result, this arrangement of the nut fastener 120 provides a compact profile with a small circumferential shape. The thickness of the retaining ring 134 may also be minimized since the longitudinal travel of the collar 50 is not inhibited by any portion of the retaining ring 134.

Accordingly, it is now apparent how the nut fastener 10, 100, 120 functions. The nut fastener 10, 100, 120 is initially placed over the end of a threaded shaft so that the inner tab 24 of the retaining ring 20, 108, 134 is engaged within a slot in the shaft. This prevents the retaining ring 20, 108, 134 from rotating relative to the shaft. The nut 70, 102, 122 is permanently secured to the retaining ring 20, 108, 134 by the flared portion 78 or the machined bead 106 of the nut 70, 102, 122 which engages the first longitudinal retaining surface 28, 112 of the retaining ring 20, 108, 134 and prevents the nut 70, 102, 122 from being separated from the retaining ring 20, 108, 134. Likewise, the collar 50 and the springs 90, 92 are trapped between the nut 70, 102, 122 and the retaining ring 20, 108, 134 so that the entire nut assembly 10, 100, 120 is permanently attached together in an integrated nut assembly 10, 100, 120. In order to unlock the nut 70, 102, 122, the engagement surface 56 of the collar 50 must be pushed toward the pressure surface 22. When the engagement surface 56 is pushed, the second spring abutment surface 54 of the collar 50 compresses the spring 90, 92 against the first spring abutment surface 44, 48 of the retaining ring 20, 108, 134. This allows the collar 50 to slide toward the retaining ring 20, 108, 134 along the first slide surface 38 of the retaining ring 20, 108, 134 and the second slide surface 62 of the collar 50 and/or the third slide surface 66 of the collar 50 and the fourth slide surface 84 of the nut 70, 102, 122. Once the collar 50 slides far enough for the second recesses 64 of the collar 50 to disengage from the tabs 82, 128 of the nut 70, 102, 122, the nut 70, 102, 122 becomes unlocked and can rotate relative to the threaded shaft, the retaining ring 20, 108, 134 and the collar 50. The longitudinal travel of the collar 50 is limited in the disengagement direction by the third stop surface 54 of the collar 50 and the fourth stop surface 40 of the retaining ring 20, 108, 134. However, the nut tabs 82, 128 and the second collar recesses 64 may disengage before the third and fourth stop surfaces 54, 40 contact. In the engagement direction, the longitudinal travel of the collar 50 is limited by the first stop surface 52 of the collar 50 and the second stop surface 76 of the nut 70, 102, 122.

When the engagement surface 56 is flush with the first stop surface 52 of the collar 50, the engagement surface 56 may be easily pushed by the end of the tool that is used to engage the wrench bearing surfaces 74, 124. Thus, for example, when a torque socket is used, the nut assembly 10, 100, 120 can be unlocked by simply sliding the torque socket onto the wrench bearing surfaces 74, 124 and pushing the torque socket against the engagement surface 56. The torque tool can then be turned to rotate the nut 70, 102, 122. Torque from rotating the nut 70, 102, 122 is translated from the second torque bearing surface 80, 104 of the nut 70, 102, 122 to the first torque bearing surface 30, 114 of the retaining ring 20, 108, 134. Since the retaining ring 20, 108, 134 does not rotate relative to the threaded shaft, the torque from the nut 70, 102, 122 is translated to longitudinal force. The longitudinal force is then applied by the pressure surface 22 to the apparatus.

When the nut fastener 10, 100, 120 has been tightened to the desired torque level, the torque tool is removed from the wrench bearing surfaces 74, 124. If the end of the torque tool is used to push the engagement surface 56 of the collar 50, removal of the torque tool also releases the collar 50. This allows the springs 90, 92 to bias the collar 50 toward the nut 70, 102, 122 until the first stop surface 52 of the collar 50 contacts the second stop surface 76 of the nut 70, 102, 122. As a result, the second collar recesses 64 receive the tabs 82, 128 of the nut 70, 102, 122. This creates a positive lock that prevents the nut 70, 102, 122 from loosening because the engagement between the nut tabs 82, 128 in the second collar recesses 64 prevent relative rotation between the nut 70, 102, 122 and the collar 50; and the engagement between the first collar recesses 58 and the retaining ring tabs 36 prevents relative rotation between the collar 50 in the retaining ring 20, 108, 134; and the engagement between the retaining ring inner tab 24 and the shaft slot prevents relative rotation between the retaining ring 20, 108, 134 and the threaded shaft. In a preferred embodiment of the nut fastener 10, 100, 120, the collar 50 may be provided with 36 locking recesses 64 and each locking recess 64 may represent 0.002" of threaded travel between the nut 70, 102, 122 and the threaded shaft. This arrangement may be particularly useful for wheel hub applications that require a specified end play for the bearings, such as 0.001"-0.005", since the required end play can be essentially dialed-in by adjusting the nut 70, 102, 122 by a certain number of locking positions 64.

Some of the advantages of the nut fastener 10, 100, 120 are also now apparent. The nut fastener 10, 100, 120 provides a positive lock between a threaded shaft and the nut 70, 102, 122. Therefore, even when the nut fastener 10, 100, 120 is subject to vibrations during use, it will not inadvertently loosen since the nut fastener 10, 100, 120 does not rely on merely increasing the resistance force to loosening, but instead solidly locks the nut 70, 102, 122 to prevent loosening. The nut fastener 10, 100, 120 is also designed to be robust so that the locking features cannot be easily broken or overcome. Thus, the nut fastener 10, 100, 120 may be particularly useful in applications, such as axle nuts where extreme torque is applied to the nut. The nut fastener 10, 100, 120 also achieves these advantages without causing an increase in torque needed to tighten the nut 70, 102, 122, which makes it easier to apply precise longitudinal force to the apparatus, such as when the nut 70, 102, 122 is used to preload wheel bearings. The nut fastener 10, 100, 120 is also useful in setting precise end play for wheel bearings and other applications. The friction surface between the first and second bearing surfaces 30, 80, 104, 114 of the retaining ring 20, 108, 134 and the nut 70, 102, 122 may also be optimized to reduce the friction that occurs during tightening of the nut 70, 102, 122.

Figure 13:
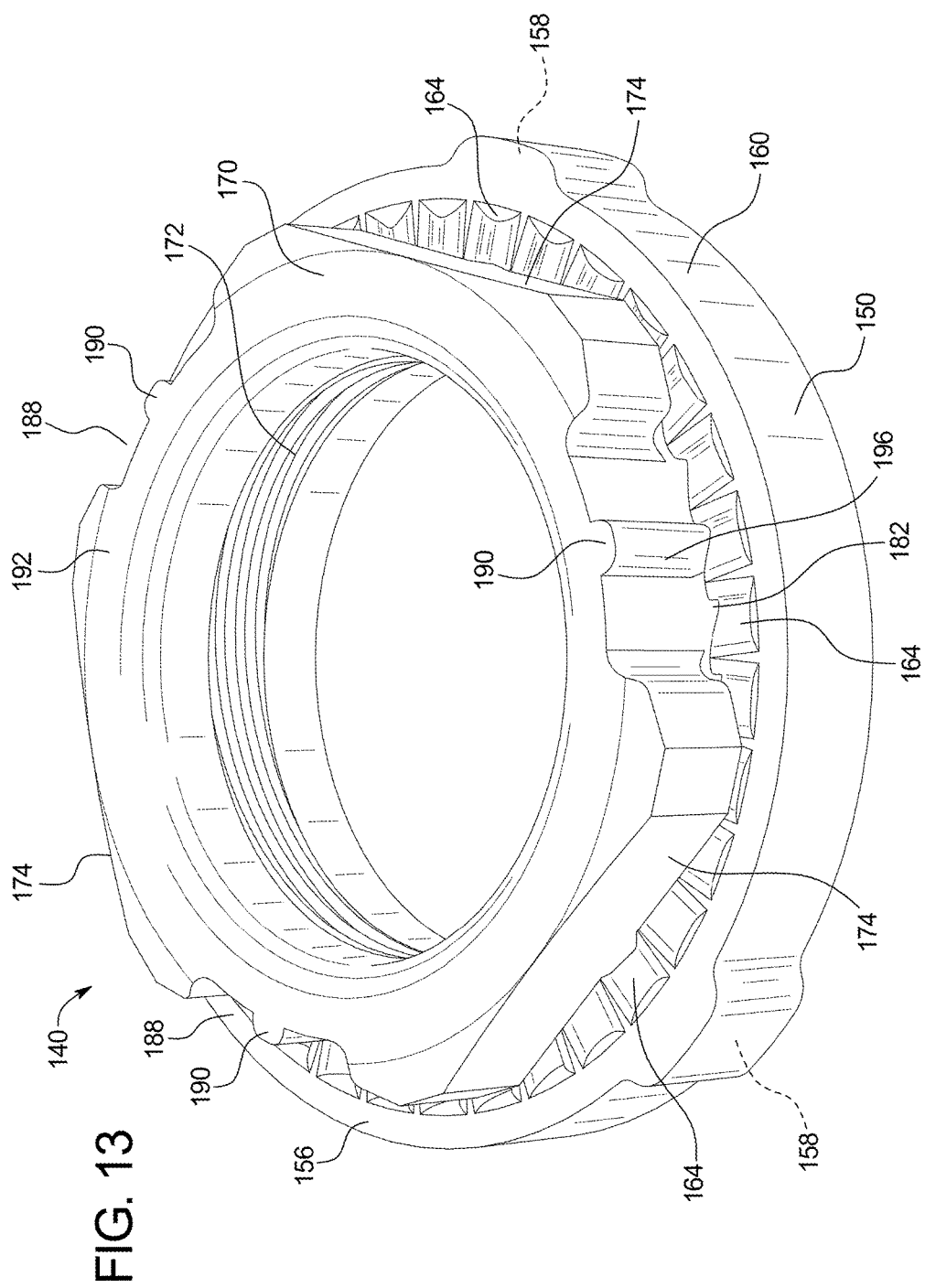
FIG. 13 is a top perspective view of another embodiment of a nut fastener.
Figure 14:
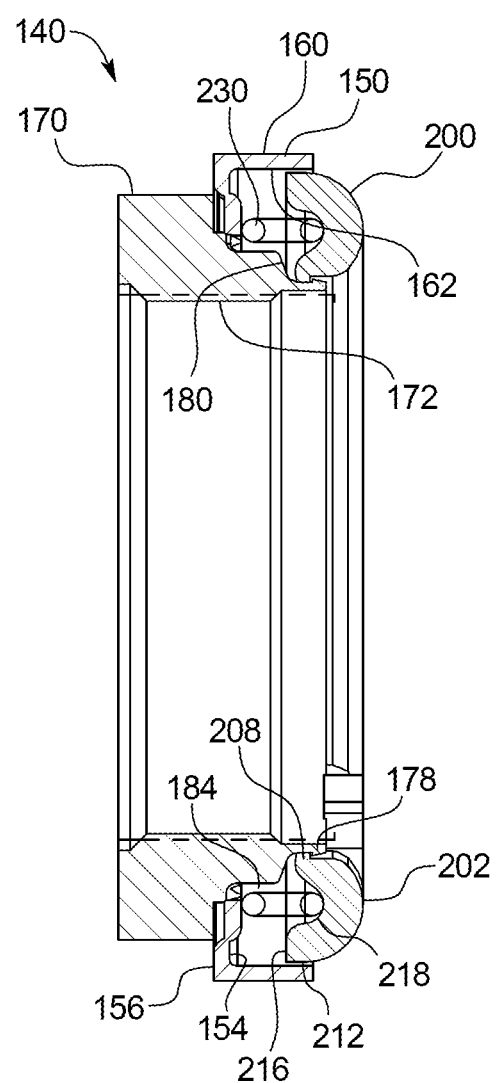
FIG. 14 is a side cross-sectional view of the nut fastener of FIG. 13.

Turning to FIGS. 13-17, another embodiment of the nut fastener 140 is shown. Those of ordinary skill in the art will recognize that a number of features of the nut fastener 140 are equivalent to features already described above. Therefore, the entire description provided above need not be repeated for an understanding of the nut fastener 140 shown in FIGS. 13-17. As shown in FIGS. 13 and 14, the nut fastener 140 includes a collar 150, nut 170, retaining ring 200, and spring 230. The nut 170 may be made by hot forging, and the collar 150 and retaining ring 200 may be made by stamping. However, other manufacturing processes may also be used.

Figure 15:
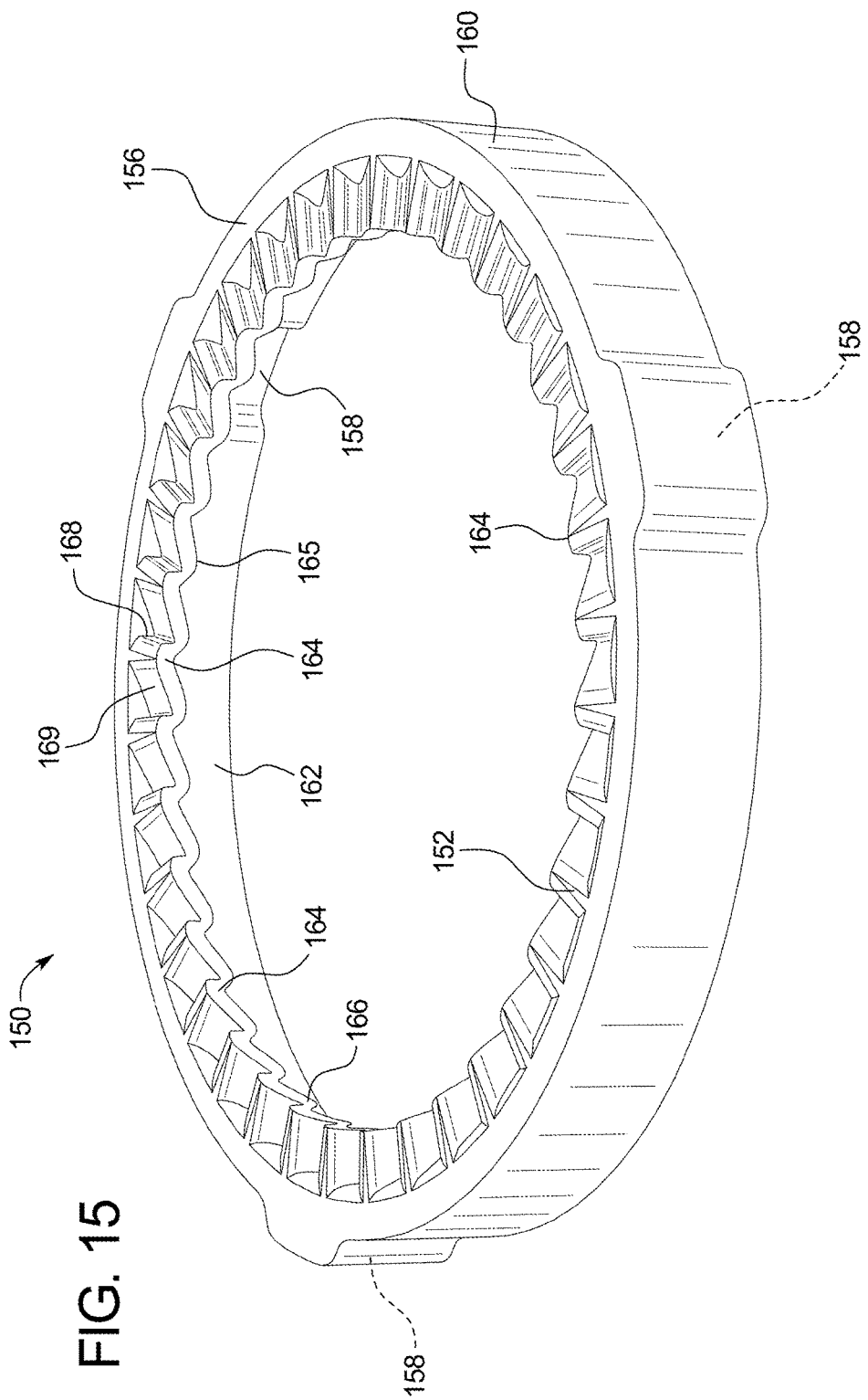
FIG. 15 is a perspective view of another embodiment of a collar.

As shown in FIG. 15, the collar 150 includes a first stop surface 152, third stop surface 154, engagement surface 156, first recesses 158, or third rotational retaining members 158, bent portion 160, second slide surface 162, first ratchet teeth 164, or fourth rotational retaining members 164, third slide surface 166, locking surfaces 168, and inclined surfaces 169.

Figure 16:
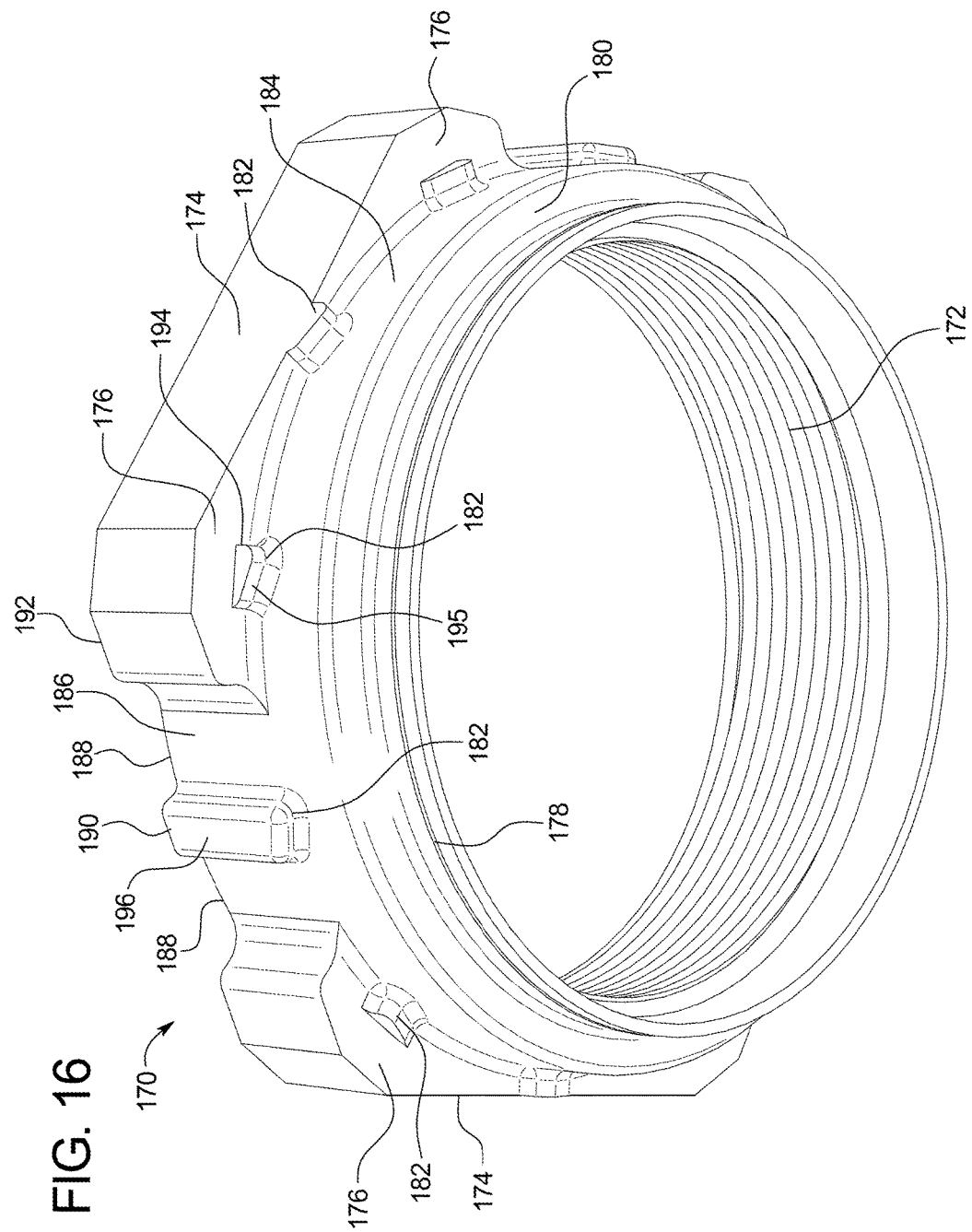
FIG. 16 is a perspective view of another embodiment of a nut.

As shown in FIG. 16, the nut 170 includes inner threads 172, wrench bearing surfaces 174, second stop surface 176, bead 178, or second longitudinal retaining member 178, second torque bearing surface 180, second ratchet teeth 182, or fifth rotational retaining members 182, fourth slide surface 184, recessed wrench bearing surfaces 186, recessed areas 188, tab end 190, top surface 192, locking surfaces 194, inclined surfaces 195, and tab 196.

Figure 17:
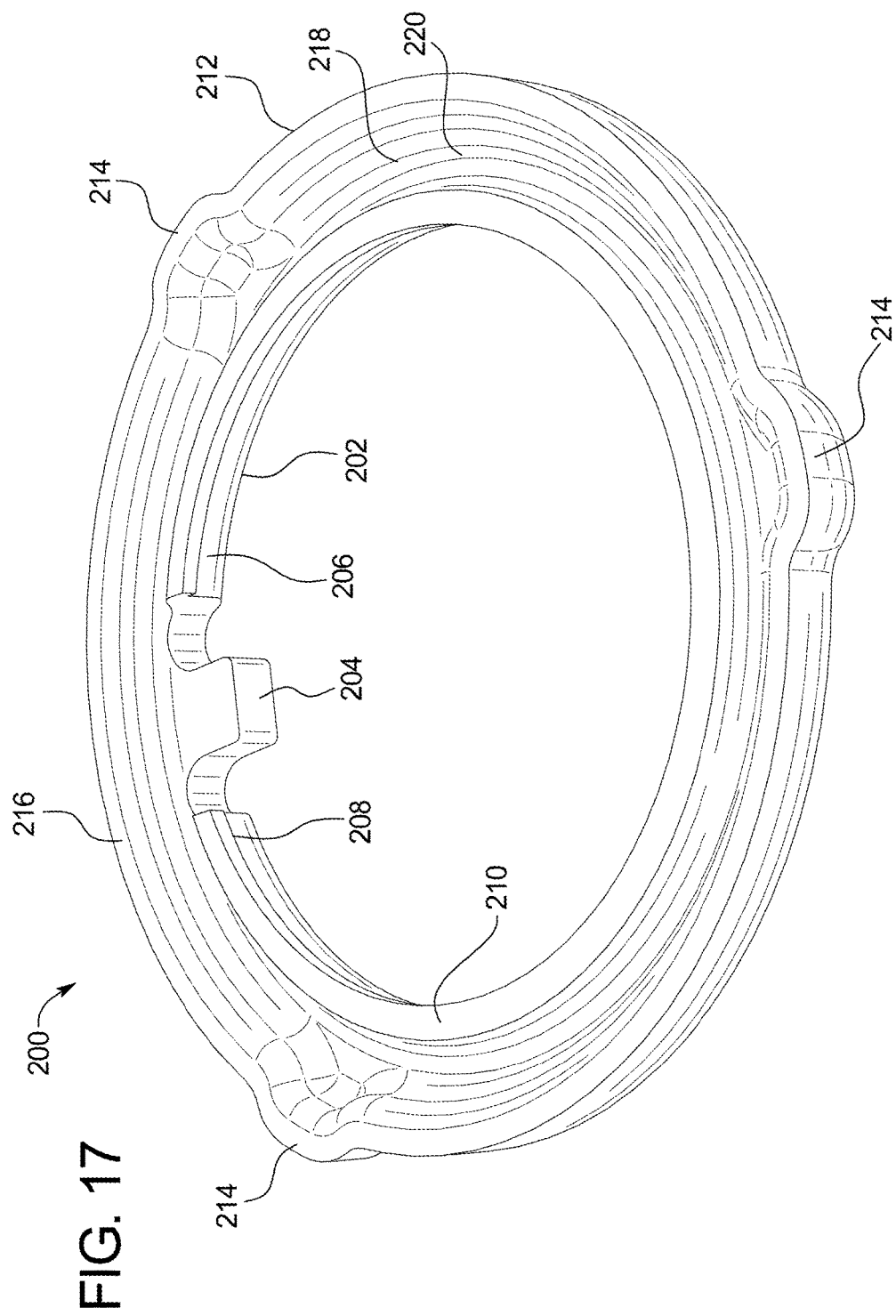
FIG. 17 is a perspective view of another embodiment of a retaining ring.

As shown in FIG. 17, the retaining ring 200 includes a pressure face 202, inner tab 204, inner diameter 206, undercut 208, or first longitudinal retaining surface 208, first torque bearing surface 210, outer diameter 212, or first slide surface 212, tabs 214, or second rotational retaining members 214, fourth stop surface 216, groove 218, and bottom 220 of groove 218, or first spring abutment surface 220.

While the nut fastener 140 is similar to the nut fasteners 10, 100, 120 described above, the nut fastener 140 includes some distinct features that may provide additional advantages. For example, the nut 170 and the collar 150 lock together through ratchet teeth 182, 164 on the nut 170 and the collar 150. Each of the nut ratchet teeth 182 face downward and have a locking surface 194 and an inclined surface 195. Each of the collar ratchet teeth 164 face upward and have a corresponding locking surface 168 and inclined surface 169. As a result, when the nut 170 is tightened, the collar 150 does not need to be independently pushed to unlock the nut fastener 140. Instead, the inclined surfaces 195, 169 of the nut ratchet teeth 182 and collar ratchet teeth 164 slide against each other when the nut 170 is rotated in the tightening direction and force the collar 150 against the spring 230. This may be more intuitive to the operator and may prevent damage to the nut fastener 140 if an operator inadvertently attempts to tighten the nut 170 without actively pushing against the collar 150. However, after the nut 170 is tightened, the locking surfaces 194, 168 of the nut ratchet teeth 182 and collar ratchet teeth 164 will engage each other and prevent the nut 170 from rotating in the loosening direction. Thus, in order to loosen the nut 170, the collar 150 must be independently pushed against the spring 230 in order to release the ratchet teeth 182, 164.

As shown in FIG. 16, at least one of the ratchet teeth 182 on the nut 170 may be on end of the tab 196 that extends through the recessed area 188 so that the end 190 of the tab 196 may be flush with the top surface 192 of the nut 170. This may provide the operator with a visual indication of the locking arrangement between the nut 170 and the collar 150.

As shown in FIGS. 13, 14 and 17, the retaining ring 200 may be made so that the outer diameter 212 fits within the bent portion 160 of the collar 150. Thus, the outer diameter 212 of the retaining ring 200 acts as the first slide surface 212 and slides along the second slide surface 162 of the collar 150. The tabs 214 of the retaining ring 200 may extend outward from the outer diameter 212 and may fit within the first recesses 158 of the collar 150. Thus, no portion of the retaining ring 200 extends outward from the collar 150 and is generally not visible during tightening and loosening of the nut fastener 140. Like the retaining ring 20 shown in FIG. 8, the retaining ring 200 may have a groove 218 for the spring 230 which extends circumferentially around the nut fastener 140. However, in order to reduce the diameter of the nut fastener 140, a coiled spring 230 may be used between the retaining ring 200 and collar 150.

As shown in FIGS. 14 and 15, the underside 165 of the ratchet teeth 164 of the collar 150 may act as the opposing surface for the spring 230. The third stop surface 154 of the collar 150 may be separate from the underside 165 of the ratchet teeth 164 and may be located radially outward therefrom. The engagement surface 156 of the collar 150 may also be a flat ring located radially outward from the ratchet teeth 164.

It is now apparent that the nut fastener 140 functions in a similar manner to the nut fasteners 10, 100, 120 described above and has similar advantages. However, the differences described above and shown in the figures may provide desirable improvements over the previously described nut fasteners 10, 100, 120.

Turning to FIGS. 18A-28B, another embodiment of a nut fastener 300 is shown. Those of ordinary skill in the art will recognize that some of the individual features of the nut fastener 300 are similar to features already described above. Therefore, the entire description provided above need not be repeated for an understanding of the nut fastener 300 shown in FIGS. 18A-28B. Although the basic operation of the nut fastener 300 functions in a similar manner to the nut fasteners described above, the nut fastener 300 provides additional advantages that may be desirable. As shown in FIGS. 18A-18D, the nut fastener 300 may include a nut 310 (FIGS. 24A-24D), a collar 340 (FIG. 25A-25D), a retaining ring 370 (FIGS. 26A-26D), a first spring 396 (FIGS. 27A-27B), and a second spring 398 (FIG. 28A-28B). The nut 310 and retaining ring 370 may be made by hot forging, and the collar 340 may be made by stamping. However, other manufacturing processes may also be used.

As shown in FIGS. 24A-24D, the nut 310 may include inner threads 312, wrench bearing surfaces 314, a bead 316, or second longitudinal retaining member 316, a second torque bearing surface 318, second ratchet teeth 320, or fifth rotational retaining members 320, first inclined surfaces 322, second inclined surfaces 324, and a bottom 328, or fourth spring abutment surface 328.

As shown in FIGS. 25A-25D, the collar 340 may include first ratchet teeth 342, or fourth rotational retaining members 342, first inclined surfaces 344, second inclined surfaces 346, an underside 348 of the ratchet teeth 342, or second spring abutment surface 348, an engagement surface 350, first recesses 352, or third rotational retaining members 352, ribs 354, or fourth longitudinal retaining members 354, a bent portion 356, an inner surface 358 of the bent portion 356, or second slide surface 358, and an inner diameter 360.

As shown FIG. 26A-26D, the retaining ring 370 may include a pressure surface 372, an inner tab 374, or first rotational retaining member 374, an inner diameter 376, an undercut groove 378, or first longitudinal retaining surface or member 378, a first torque bearing surface 380, an outer circumference 382, or first slide surface 382, tabs 384, or second rotational retaining members 384, a bottom side 386 of the tabs 384, or third longitudinal retaining member 386, a top surface 388, or first spring abutment surface 388, and an inner ledge 390, or third spring abutment surface 390.

As shown FIGS. 19A-19D, one feature of the nut fastener 300 is that the nut 310 can free spin relative to the collar 340 during initial threading of the nut 310 onto the shaft so that the nut fastener 300 is easier to install. In FIGS. 19A-19D, the nut fastener 300 is illustrated in its initial position before being threaded onto a shaft. As shown, the first and second ratchet teeth 342, 320 of the collar 340 and the nut 310 are disengaged from each other when the bead 316 of the nut 310 is engaged with the undercut 378 of the retaining ring 370 and the ribs 354 of the collar 340 are engaged with the bottom side 386 of the tabs 384 of the retaining ring 370. In order to provide an initial free spinning stage, the sizing of the spaces 330, 362 between the ratchet teeth 320, 342 and the retaining members 316, 378, 354, 386 has been adjusted to provide an initial position where the ratchet teeth 320, 342 are disengaged from each other. Specifically, the spacing 330 between the nut ratchet teeth 320 and the nut bead 316 are controlled relative to the spacing 362 between the collar ratchet teeth 342 and the collar ribs 354 so that when the nut 310 and the collar 340 are at their uppermost positions, the ratchet teeth 320, 342 are disengaged from each other. As a result, this design requires two different stops to limit longitudinal movement of the nut 310 and the collar 340. The first stop (i.e., the bead 316 and undercut 378) limits movement between the nut 310 and the retaining ring 370 and prevents the nut 310 and retaining ring 370 from being separated from each other. The second stop (i.e., the ribs 354 and the bottom side 386 of the tabs 384) limits movement between the collar 340 and the retaining ring 370 and prevents the collar 340 and retaining ring 370 from being separated from each other. Thus, by controlling the positioning of these stops relative to the ratchet teeth 320, 342, a free spinning region can be provided where the ratchet teeth 320, 342 do not engage each other.

Figure 19D:
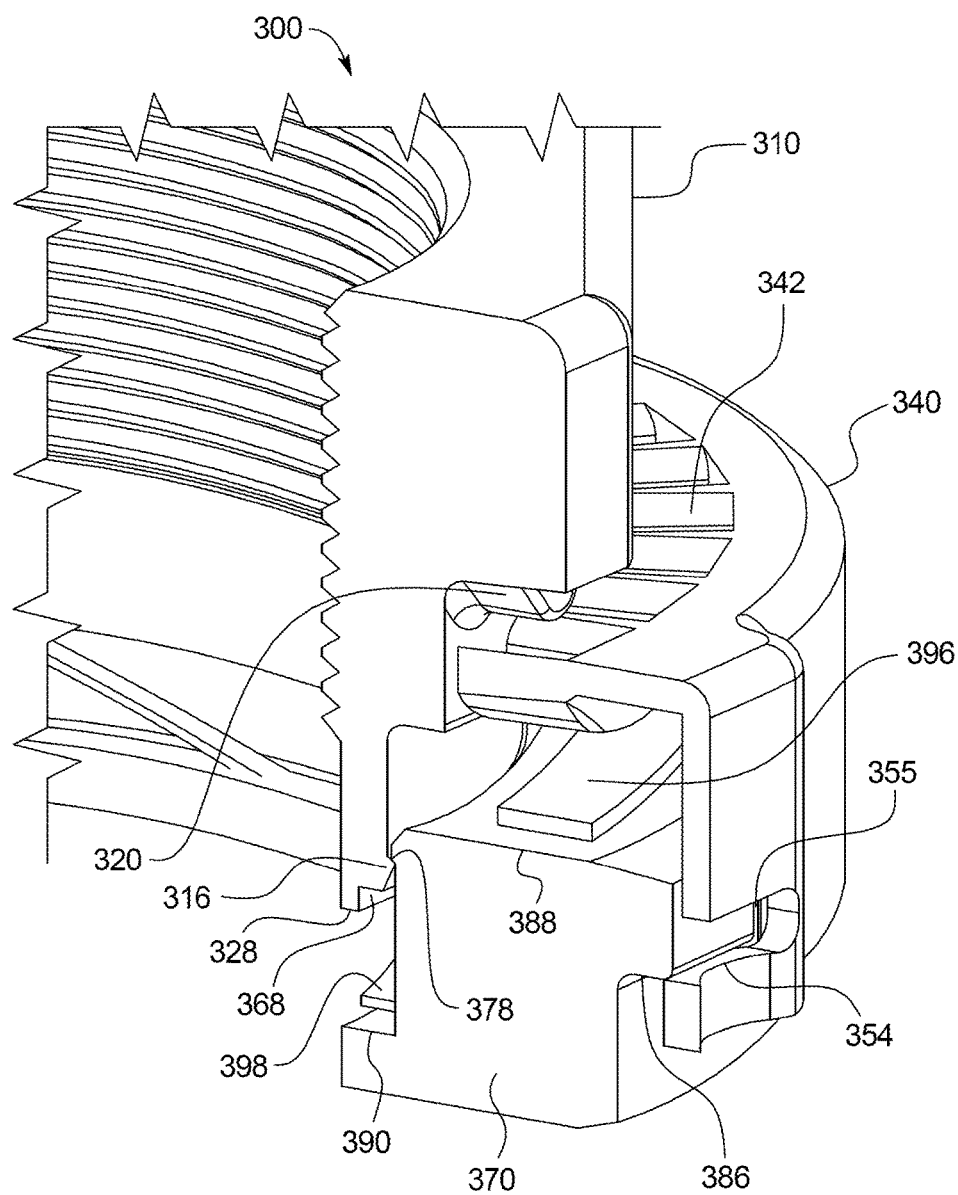

In FIG. 19D, the nut fastener 300 is shown with an alternative fourth longitudinal retaining member 354. Unlike the rib 354 of FIG. 19C where the bottom edge of the collar 340 is bent inwards, the collar 340 of FIG. 19D has a slot 355 and the bottom edge of the slot 355 is bent inward. The bottom edge surface of the slot 355 which contacts the bottom side 386 of the tab 384 is preferably perpendicular to the axis of nut fastener 300. The bottom side 386 of the tab 384 may also be perpendicular to the axis of the nut fastener 300. This configuration may be desirable to provide a more consistent stop location between the collar 340 and the retaining ring 370. As also shown in FIG. 19D, the nut 310 may have a guide surface 368 between the bottom 328 of the nut 310 and the bead 316. The guide surface 368 has a diameter that is slightly smaller than the inner diameter of the second spring 398. Thus, the spring 398 seats around the guide surface 368, and the guide surface 368 helps to retain spring 398 in place.

FIGS. 20A-20B illustrate the nut faster 300 in an intermediate position as it is being threaded onto the shaft. As the nut 310 is tightened onto the shaft, the pressure face 372 of the retaining ring 370 will eventually contact the apparatus, such as a bearing or housing, and start to apply force to the apparatus. Since the retaining ring 370 can no longer move longitudinally as the nut 310 is tightened, the nut 310 will begin to move longitudinally toward the retaining ring 370. This causes the bead 316 of the nut 310 to move away from the undercut 378 of the retaining ring 370. As a result, the ratchet teeth 320, 342 of the nut 310 and collar 340 will draw toward each other and begin to engage each other. As the ratchet teeth 320, 342 engage each other and the nut 310 is tightened further, the nut ratchet teeth 320 ride over the collar ratchet teeth 342 and push the collar 340 toward the retaining ring 370. This causes the ribs 354 of the collar 340 to move away from the bottom side 386 of the tabs 384 of the retaining ring 370.

Figure 21A:
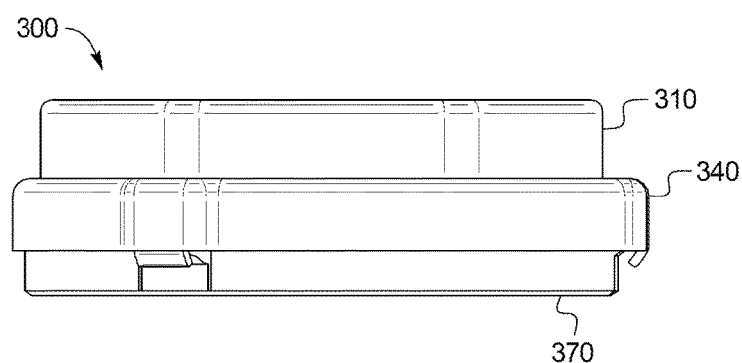
FIGS. 21A-21C are views of the nut fastener, showing a final position with the ratchet teeth and torque bearing surfaces fully engaged.
Figure 21B:
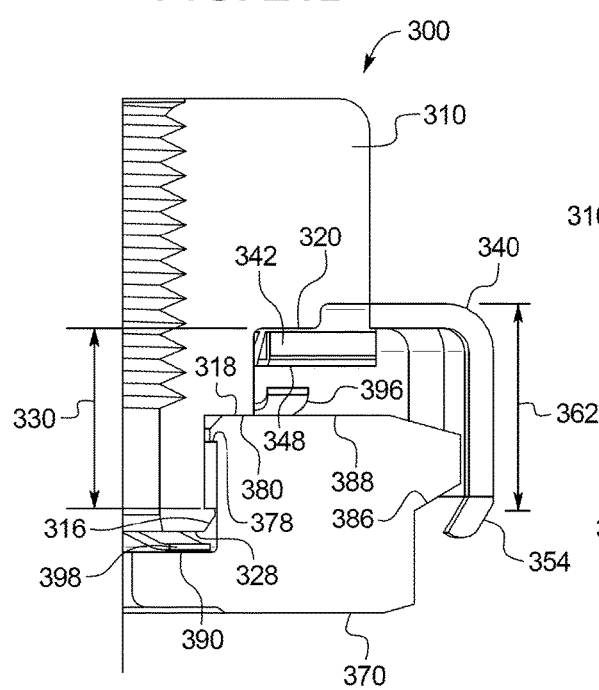
Figure 21C:
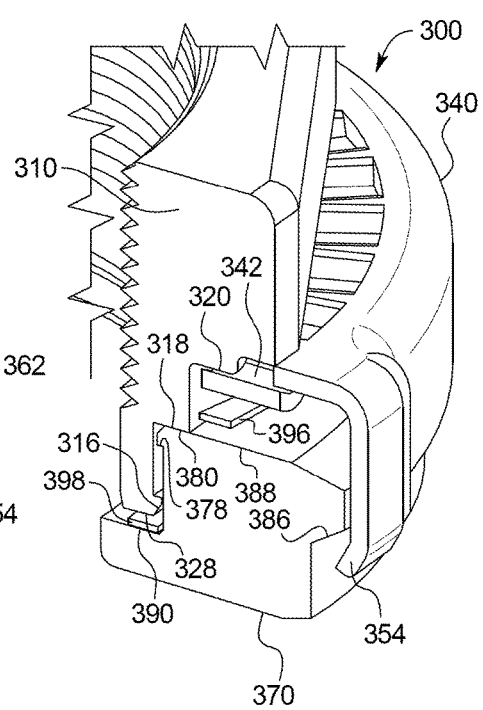

As shown in FIGS. 21A-21O, when the nut 310 is fully tightened, the ratchet teeth 320, 342 of the nut 310 and collar 340 will be fully engaged with each other. This locks the nut fastener 300 so that the ratchet teeth 320, 342 resist loosening of the nut 310. As shown, the ratchet teeth 320, 342 are fully engaged when the first and second torque bearing surfaces 380, 318 of the retaining ring 370 and the nut 310 are engaged with each other. Preferably, the free spinning range is relatively small, and the ratchet teeth 320, 342 begin to engage each other after 1.5 rotations or less of the nut 310 on the shaft. The intermediate range between initial and full engagement of the ratchet teeth 320, 342 may be more than the free spinning range, and is preferably about one to about three rotations of the nut 310 on the shaft.

Figure 27A:
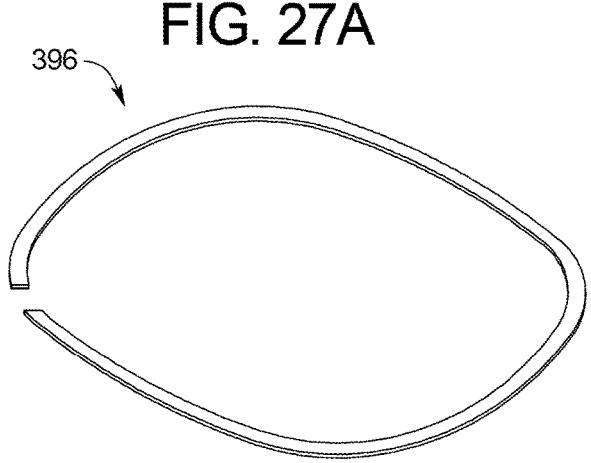
FIGS. 27A-27B are views of the first spring.
Figure 28A:
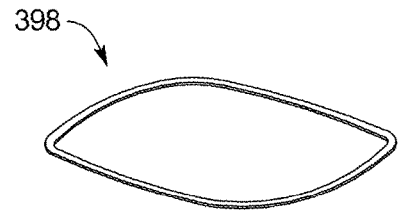
FIGS. 28A-28B are views of the second spring.
Figure 27B:
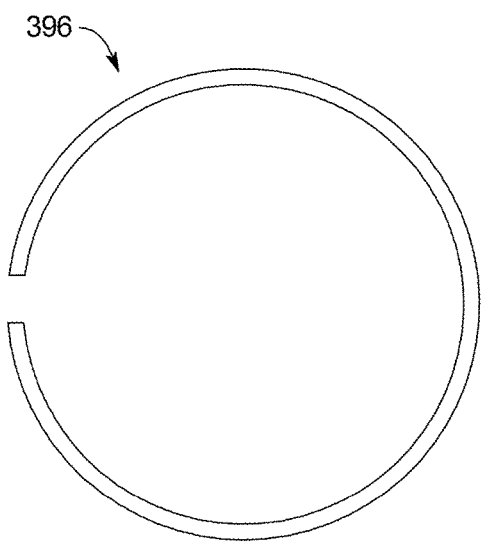
Figure 28B:
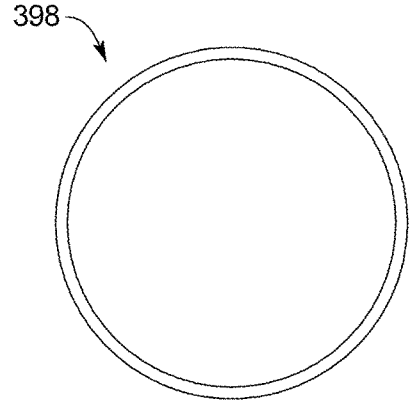

As shown in FIGS. 19A-21C and 27A-28B, the nut fastener 300 may also be provided with two separate springs 396, 398. The first spring 396 may be positioned between the top surface 388 of the retaining ring 370 and underside 348 of the ratchet teeth 342. Thus, the first spring 396 biases the retaining ring 370 and collar 340 away from each other until contact between the ribs 354 of the collar 340 and the bottom side 386 of the tabs 384 of the retaining ring 370 stops further travel. The second spring 398 may be positioned between an inner ledge 390 of the retaining ring 370 and the bottom 328 of the nut 310. Thus, the second spring 398 biases the retaining ring 370 and nut 310 away from each other until contact between the bead 316 of the nut 310 and undercut 378 of the retaining ring 370 stops further travel. One advantage of the second spring 398 is that when the nut 310 is in the free spinning range during initial threading of the nut 310 onto the shaft, the second spring 398 will force the nut 310 away from the retaining ring 370 (and away from the collar 340 since the collar 340 is retained to the retaining ring 370). This allows the nut 310 to be truly free spinning since inadvertent contact between the ratchet teeth 320, 342 will be avoided due to the bias of the second spring 398. Although different types of springs are possible, circular, wave springs 396, 398 that extend around the axis of the fastener 300 are preferred for the first and second springs 396, 398 to provide balanced spring force and a compact design. As shown in FIGS. 27A-27B, which illustrates the first spring 396, the springs 396, 398 may have a gap between the ends, or as shown in FIGS. 28A-28B, which illustrates the second spring 398, the springs 396, 398 may have ends that overlap or may be a continuous ring. As explained above, when the nut 310 is tightened onto the shaft, the nut 310 moves toward the collar 340, which compresses the second spring 398. Because the second spring 398 is designed to facilitate the free spinning range of the nut 310 and is not intended to control the tension between the ratchet teeth 320, 342, it is preferred for the bias force of the second spring 398 to be as small as possible. For example, in the embodiment illustrated in the figures, the bias of the second spring 398 counters the bias of the first spring 396, such that the bias of the first spring 396 forces the ratchet teeth 320, 342 into engagement, but the second spring 398 forces the ratchet teeth 320, 342 apart from each other. Thus, the second spring 398 can affect the tension of the ratchet teeth 320, 342, but it is preferred that the second spring 398 have minimal influence on the tension of the ratchet teeth 320, 342. Thus, the bias of the first spring 396 is preferably greater than the bias of the second spring 398, and more preferably at least two times or four times greater than the bias of the second spring 398.

As shown in FIGS. 22-23, the nut fastener 300 may also be provided with ratchet teeth 320, 342 that resist relative rotation between the nut 310 and the collar 340. As shown in FIG. 22, the ratchet teeth 320 on the nut 310 may include a first inclined surface 322 that faces the tightening direction and a second inclined surface 324 that faces the loosening direction. Similarly, the collar 340 may include a first inclined surface 344 that faces the tightening direction and a second inclined surface 346 that faces the loosening direction. Preferably, the ratchet teeth 320, 342 are shaped to allow the ratchet teeth 320, 342 to ride over each other in the tightening direction and press the collar 340 toward the retaining ring 370 to allow the nut 310 to be rotated relative to the collar 340 and the retaining ring 370. The ratchet teeth 320, 342 may also be shaped to allow the ratchet teeth 320, 342 to ride over each other in the loosening direction and press the collar 340 toward the retaining ring 370 to allow the nut 310 to be rotated relative to the collar 340 and the retaining ring 370. It may be desirable for the shapes of the nut ratchet teeth 320 and the collar ratchet teeth 342 to generally match each other so that the nut ratchet teeth 320 seat within the collar ratchet teeth 342 when the ratchet teeth 320, 342 are fully engaged.

Preferably, the torque required for the ratchet teeth 320, 342 to ride over each other is higher in the loosening direction than in the tightening direction. This may be achieved by providing a steeper incline on the second inclined surfaces 324, 346 facing in the loosening direction than the first inclined surfaces 322, 344 facing in the tightening direction. In other words, the shape of the nut ratchet teeth 320 or the collar ratchet teeth 342 is asymmetric. Thus, the nut 310 will have less resistance to rotating in the tightening direction but will have greater resistance to rotating in the loosening direction. For example, it may be particularly useful for the torque required to ride the ratchet teeth 320, 342 over each other in the tightening direction to be high enough that a wrench is required to rotate the nut 310. Although the torque in the tightening direction could be set lower to allow hand tightening, setting the torque higher to require a wrench may avoid inadvertent movement of the nut 310 during installation which may prevent misadjustments to sensitive settings like bearing end play in axle wheels. For example, a torque of at least about 10 ft·lb may be desirable in the tightening direction before the ratchets 320, 342 will ride over each other to allow the nut 310 to rotate. On the other hand, it may be preferable for the torque required to ride the ratchet teeth 320, 342 over each other in the loosening direction to be substantially greater than in the tightening direction to prevent the nut 310 from loosening during use due to vibrations, etc. For example, it may be desirable for the loosening torque required to ride the ratchet teeth 320, 342 over each other to be at least three times the tightening torque. Thus, the loosening torque (not including thread engagement torque) may be at least about 40 ft·lb. However, it is preferred that the total loosening torque required to loosen the nut 310 (including both the thread torque and the ratchet torque) be less than the torque that would damage the shaft slot, inner tab 374, or other parts of the nut fastener 300. For example, it is preferable that the loosening torque to ride the ratchet teeth 320, 342 over each other (without the thread torque) be less than about 100 ft·lb. Thus, unlike some nut fasteners which are either destroyed or damage the shaft when they are loosened without releasing the locking mechanism, the nut fastener 300 with ratchet teeth 320, 342 can be loosened with a wrench without actively pushing on the collar 340 while avoiding damage to the shaft and the nut fastener 300.

Figure 18A:
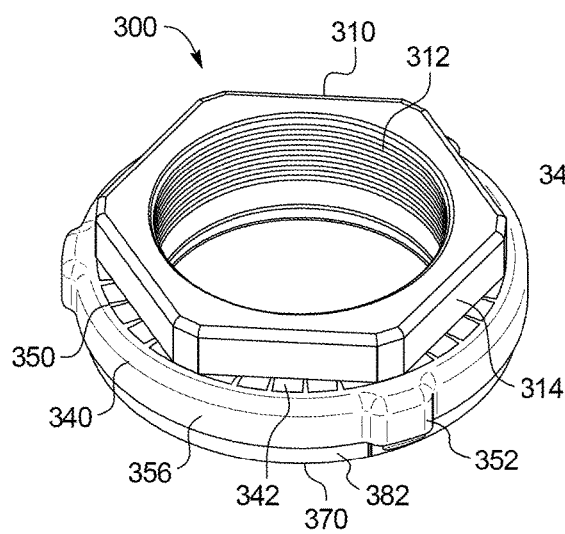
FIGS. 18A-18D are perspective views of another embodiment of a nut fastener.
Figure 18B:
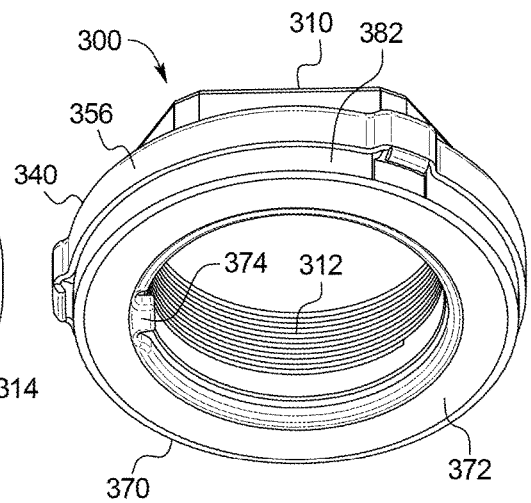
Figure 18C:
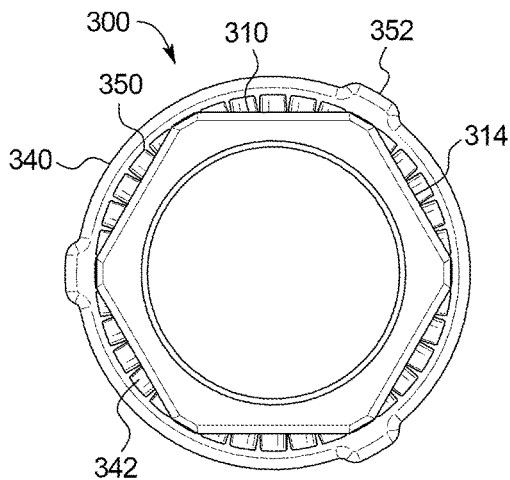
Figure 18D:
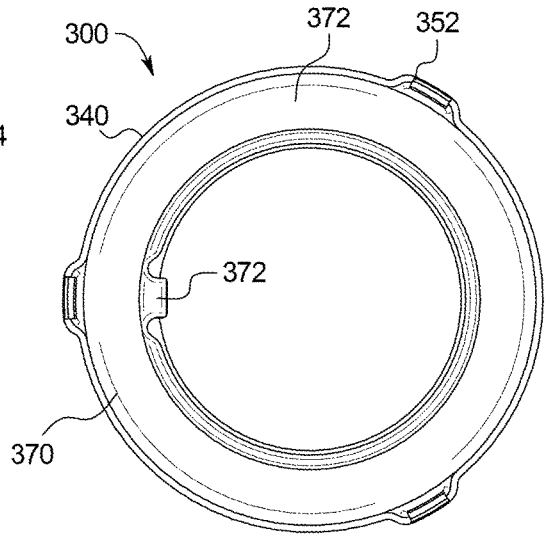

Although the nut fastener 300 may be tightened and loosened without actively pushing the collar 340 away from the nut 310 to disengage the ratchet teeth 320, 342 before rotating the nut 310, an engagement surface 350 is provided on the collar 340 for this purpose. As shown in FIGS. 18A and 18C, the engagement surface 350 may be a top surface of the collar 340 that extends radially outward from the wrench bearing surfaces 314 and rests at the bottom of the wrench bearing surfaces 314 when the ratchet teeth 320, 342 are fully engaged. As shown, it may be desirable for the engagement surface 350 to be generally flush with the top of the ratchet teeth 342 of the collar 340. Thus, when the engagement surface 350 is used, the end of the wrench, such as a socket, can be pressed against the engagement surface 350 to longitudinally push against the collar 340. This compresses the spring 396 and causes the ratchet teeth 320, 342 to separate from each other. As a result, the ratchet teeth 320, 342 will not require any torque to overcome the ratchet teeth 320, 342 during tightening and loosening if the teeth 320, 342 are fully disengaged, or if only partially disengaged, will require less torque to ride over each other than if the engagement surface 350 is not pressed at all.

Figure 24A:
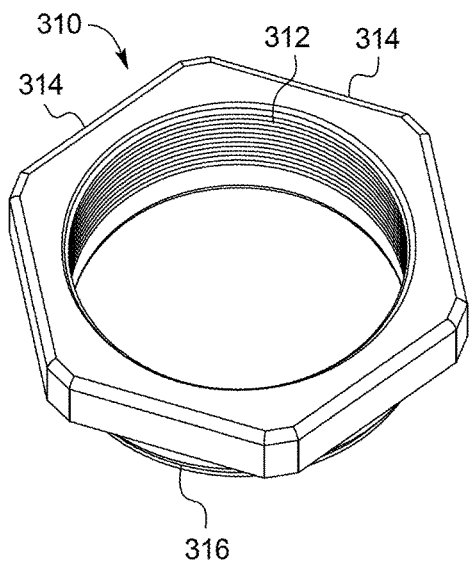
FIGS. 24A-24D are perspective views of the nut.
Figure 24B:
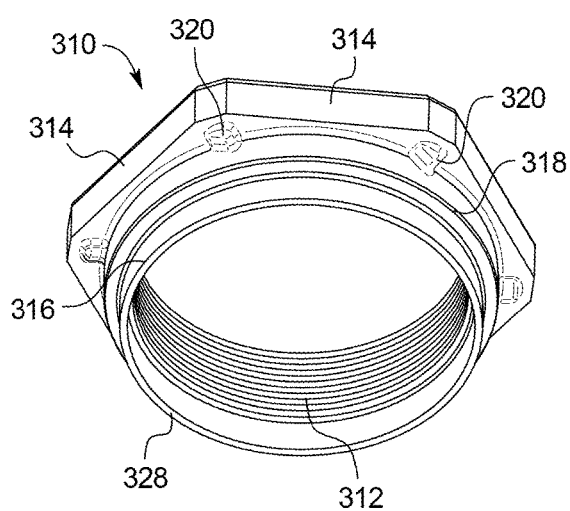
Figure 24C:
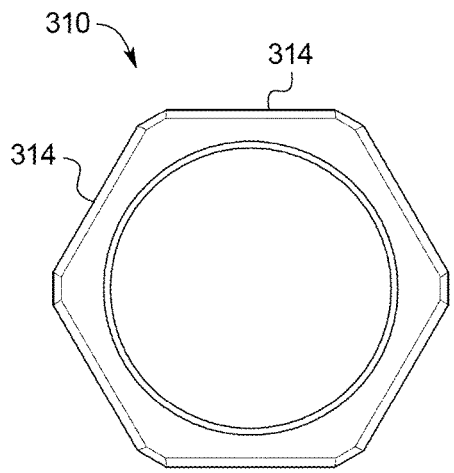
Figure 24D:
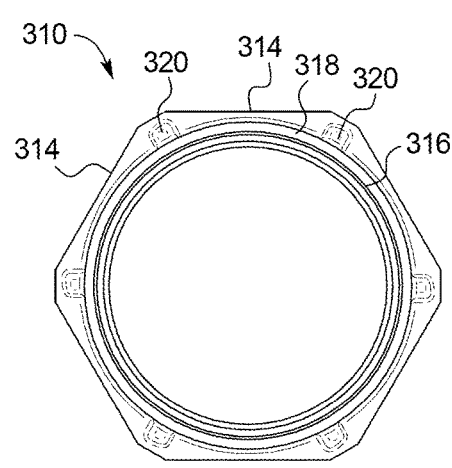
Figure 25A:
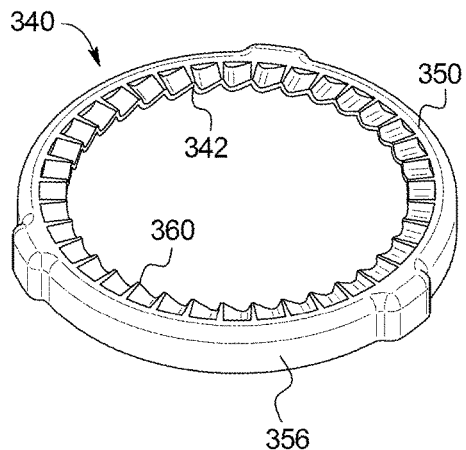
FIGS. 25A-25D are perspective views of the collar.
Figure 25B:
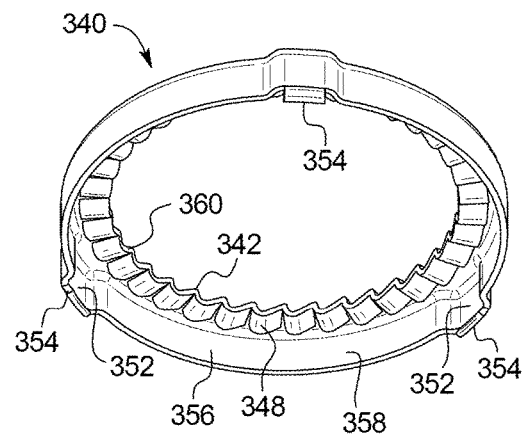
Figure 25C:
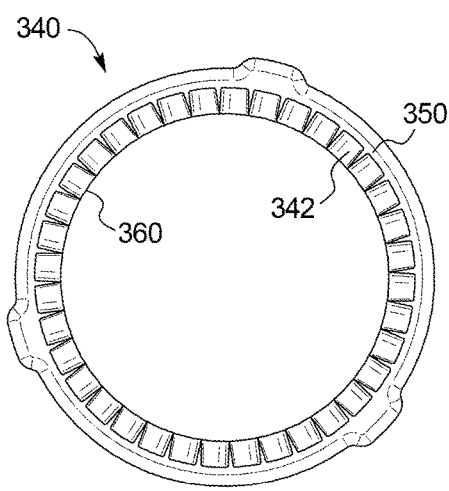
Figure 25D:
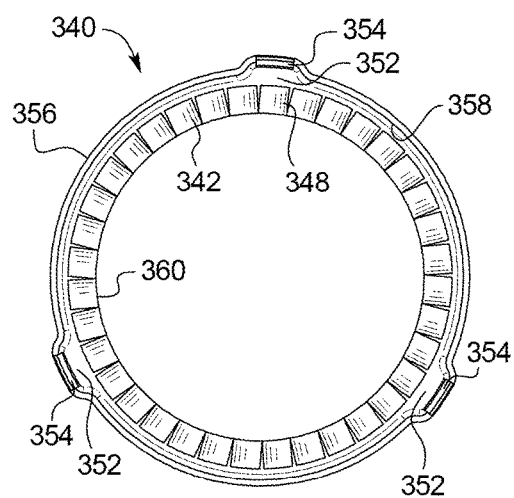
Figure 26A:
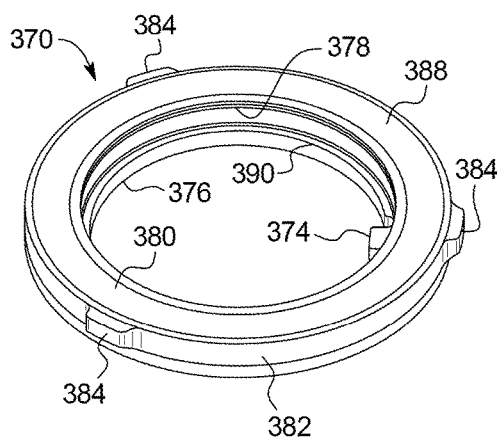
FIGS. 26A-26D are perspective views of the retaining ring.
Figure 26B:
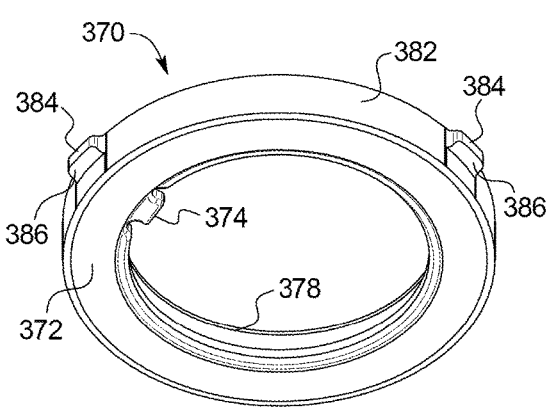
Figure 26C:
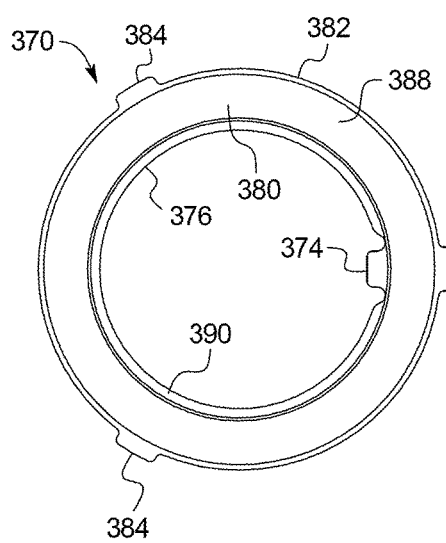
Figure 26D:
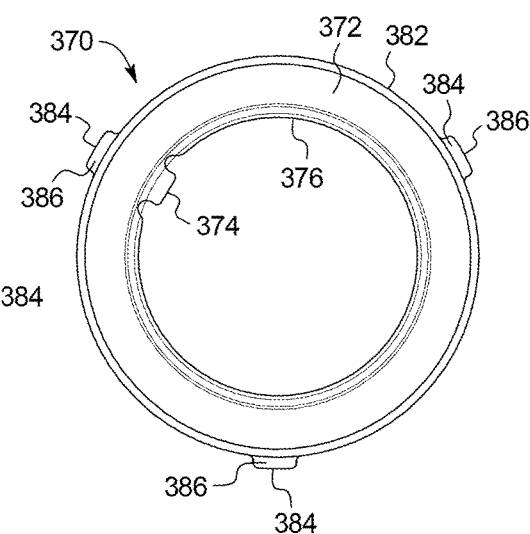

One advantage of the nut fastener 300 is the clean outer design of the nut fastener 300 and its small outer profile. This is accomplished in part by the bent portion 356 of the collar 340 that wraps around the retaining ring 370 and encompasses the outer circumference 382 of the retaining ring 370. The tabs 384 of the retaining ring 370 may also be located on the outer surface of the retaining ring 370. The recesses 352 of the collar 340 may be located on the inside of the bent portion 356 to engage with the tabs 384 of the retaining ring 370. Preferably, the inner surface of the bent portion 356 encompasses the entire outer circumference 382 of the retaining ring 370 so that no portion of the retaining ring 370 extends out from the inner surface of the bent portion 356. As shown in FIGS. 23 and 25B, the collar 340 may also be stamped from a plate so that the collar 340 has a uniform thickness throughout, including the ratchet teeth 342. As shown in FIGS. 24B and 24D, it may also be desirable to locate the nut ratchet teeth 320 only under the corners of the wrench bearing surfaces 314, since there is greater radial space available under the corners for the ratchet teeth 320. Preferably, the nut 310 has at least two teeth 320 so that if one tooth 320 fails there will still be one tooth 320 available for locking. Alternatively, where the nut 310 has six wrench bearing surfaces 314, the nut 310 may have six ratchet teeth 320, with one tooth 320 underneath each corner.

While preferred embodiments of the invention have been described, it should be understood that the invention is not so limited, and modifications may be made without departing from the invention. The scope of the invention is defined by the appended claims, and all devices that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

The invention claimed is:

1. A nut fastener, comprising:
   a retaining ring comprising:
      a first rotational retaining member engageable with a shaft thereby preventing relative rotation between said retaining ring and said shaft,
      a pressure surface adapted to apply longitudinal force to an apparatus,
      a first spring abutment surface,
      a second spring abutment surface, and
      a second rotational retaining member;
   a collar comprising:
      a third rotational retaining member engaged with said second rotational retaining member thereby preventing relative rotation between said collar and said retaining ring, said second spring abutment surface, and a fourth rotational retaining member,
      a first spring disposed between said first spring abutment surface and said second spring abutment surface, said first spring thereby biasing said collar away from said retaining ring and said collar being longitudinally moveable toward said retaining ring by compressing said first spring, and
      a second spring;
   a nut comprising:
      a third spring abutment surface engaged with a first torque bearing surface thereby translating a longitudinal force from said nut to said retaining ring,
      a fourth spring abutment surface,
      a fifth rotational retaining member engageable with said fourth rotational retaining member thereby resisting relative rotation between said nut and said collar when said collar is biased away from said retaining ring by said first spring, and
      inner threads engageable with external threads on said shaft,
   wherein a force applied to said collar compresses said first spring between the first and third spring abutment surfaces and moves said collar toward said retaining ring, said fourth rotational retaining member and said fifth rotational retaining member thereby disengaging from each other to allow relative rotation between said nut and said collar,
   wherein said second spring is disposed between said second abutment surface and said fourth spring abutment surface, said second spring thereby biasing said nut away from said retaining ring and said nut being longitudinally moveable toward said retaining ring and said collar by compressing a third spring,
   wherein a bias of said first spring is greater than a bias force of said second spring, wherein said bias force of said first spring is at least two times greater than said bias force of said second spring.

2. The nut fastener of claim 1, wherein said retaining ring includes a first longitudinal retaining member,
   wherein said nut comprises a second longitudinal retaining member engaged with said first longitudinal retaining member thereby preventing said nut and said retaining ring from separating from each other,
   wherein said retaining ring comprises a third longitudinal retaining member and said collar comprises a fourth longitudinal retaining member, said fourth longitudinal retaining member engaged with said third longitudinal retaining member thereby preventing said collar and said retaining ring from separating from each other,
   wherein a first spacing between said fifth rotational retaining member and said second longitudinal retaining member of said nut and a second spacing between said fourth rotational retaining member and said fourth longitudinal retaining member of said collar is sized relative thereto such that said fourth and fifth rotational retaining members are disengaged from each other when said first and second longitudinal retaining members are engaged and said third and fourth longitudinal retaining members are engaged, said nut thereby free spinning relative to said collar during initial threading of said nut onto said shaft, and additional threading of said nut onto said shaft as said retaining ring applies force to said apparatus draws said fourth and fifth rotational retaining members into engagement with each other.

3. The nut fastener of claim 1, wherein said retaining ring further comprises a second spring disposed between said third spring abutment surface and said fourth spring abutment surface, said second spring thereby biasing said nut away from said retaining ring and said nut being longitudinally moveable toward said retaining ring and said collar by compressing said second spring.

4. The nut fastener of claim 3, wherein said first spring and said second spring are both circular springs disposed around an axis of said nut fastener.

5. The nut fastener of claim 3, wherein a bias force of said first spring is greater than a bias force of said second spring, wherein said bias force of said first spring is at least two times greater than said bias force of said second spring.

6. The nut fastener of claim 1, wherein at least one of said fourth and fifth rotational retaining members is a ratchet tooth with a first inclined surface and a second inclined surface, engagement between said fourth and fifth rotational retaining members along said first inclined surface biasing said collar toward said retaining ring to allow relative rotation between said nut and said collar in a tightening direction, and engagement between said fourth and fifth rotational retaining members along said second inclined surface biasing said collar toward said retaining ring to allow relative rotation between said nut and said collar in a loosening direction, said second inclined surface having a steeper incline than said first inclined surface such that said fourth and fifth rotational retaining members have greater resistance to relative rotation in said loosening direction than said tightening direction.

7. The nut fastener of claim 6, wherein a resistance between said fourth and fifth rotational retaining members in said tightening direction is high enough to require said tool to tighten said nut when said fourth and fifth rotational retaining members are fully engaged, wherein a resistance between said fourth and fifth rotational retaining members in said loosening direction is at least three times said resistance in said tightening direction.

8. The nut fastener of claim 6, wherein said fourth and fifth rotational retaining members each comprise a ratchet tooth, each of said ratchet teeth comprising one of said first inclined surface and one of said second inclined surface, wherein both of said second inclined surfaces of the fourth and fifth rotational retaining members have steeper inclines than both of said first inclined surfaces of said fourth and fifth rotational retaining members.

9. The nut fastener of claim 1, wherein said collar further comprises a longitudinal portion extending toward said retaining ring, wherein an inner surface of said longitudinal portion encompasses said entire outer circumference of said retaining ring, wherein no portion of said retaining ring extends out from said inner surface of said longitudinal portion.

10. The nut fastener of claim 1, wherein said collar comprises an engagement surface, a longitudinal force applied to said engagement surface by said tool when loosening said nut compressing said first spring to move said collar toward said retaining ring and at least partially disengaging said fourth and fifth rotational retaining members.

11. The nut fastener of claim 10, wherein said engagement surface is generally flush with a top of said fourth rotational retaining member, said engagement surface being disposed adjacent a bottom end of said wrench bearing surfaces when said fourth and fifth rotational retaining members are fully engaged, said engagement surface thereby being engageable by an end of said tool when said tool engages said wrench bearing surfaces to apply said longitudinal force.

12. The nut fastener of claim 1, further comprising at least two of said fifth rotational retaining member, said fifth rotational retaining members being disposed under corners between adjacent of said wrench bearing surfaces.

13. The nut fastener of claim 1, wherein said collar is a stamping from a plate, said collar thereby having a generally uniform thickness.

14. The nut fastener of claim 1, wherein said retaining ring includes a first longitudinal retaining member, wherein said nut comprises a second longitudinal retaining member engaged with said first longitudinal retaining member thereby preventing said nut and said retaining ring from separating from each other, wherein said retaining ring comprises a third longitudinal retaining member and said collar comprises a fourth longitudinal retaining member, said fourth longitudinal retaining member engaged with said third longitudinal retaining member thereby preventing said collar and said retaining ring from separating from each other, a first spacing between said fifth rotational retaining member and said second longitudinal retaining member of said nut and a second spacing between said fourth rotational retaining member and said fourth longitudinal retaining member of said collar being sized relative thereto such that said fourth and fifth rotational retaining members are disengaged from each other when said first and second longitudinal retaining members are engaged and said third and fourth longitudinal retaining members are engaged, said nut thereby free spinning relative to said collar during initial threading of said nut onto said shaft, and additional threading of said nut onto said shaft as said retaining ring applies force to said apparatus draws said fourth and fifth rotational retaining members into engagement with each other.

15. The nut fastener of claim 12, wherein at least one of said fourth and fifth rotational retaining members is a ratchet tooth with a first inclined surface, engagement between said fourth and fifth rotational retaining members along said first inclined surface biasing said collar toward said retaining ring to allow relative rotation between said nut and said collar in a tightening direction.

16. The nut fastener of claim 13, wherein said first spring and said second spring are both circular springs disposed around an axis of said fastener, and a bias force of said first spring is at least four times greater than a bias force of said second spring.

17. The nut fastener of claim 1, wherein said retaining ring includes a first longitudinal retaining member, wherein said nut comprises a second longitudinal retaining member engaged with said first longitudinal retaining member thereby preventing said nut and said retaining ring from separating from each other, wherein said retaining ring comprises a third longitudinal retaining member and said collar comprises a fourth longitudinal retaining member, said fourth longitudinal retaining member engaged with said third longitudinal retaining member thereby preventing said collar and said retaining ring from separating from each other, a first spacing between said fifth rotational retaining member and said second longitudinal retaining member of said nut and a second spacing between said fourth rotational retaining member and said fourth longitudinal retaining member of said collar being sized relative thereto such that said fourth and fifth rotational retaining members are disengaged from each other when said first and second longitudinal retaining members are engaged and said third and fourth longitudinal retaining members are engaged, said nut thereby free spinning relative to said collar during initial threading of said nut onto said shaft, and additional threading of said nut onto said shaft as said retaining ring applies force to said apparatus draws said fourth and fifth rotational retaining members into engagement with each other, at least one of said fourth and fifth rotational retaining members is a ratchet tooth with a first inclined surface and a second inclined surface, engagement between said fourth and fifth rotational retaining members along said first inclined surface biasing said collar toward said retaining ring to allow relative rotation between said nut and said collar in a tightening direction, and engagement between said fourth and fifth rotational retaining members along said second inclined surface biasing said collar toward said retaining ring to allow relative rotation between said nut and said collar in a loosening direction, said second inclined surface having a steeper incline than said first inclined surface such that said fourth and fifth rotational retaining members have greater resistance to relative rotation in said loosening direction than said tightening direction.

18. The nut fastener of claim 16, wherein said first spring and said second spring are both circular springs disposed around an axis of said nut fastener, a resistance between said fourth and fifth rotational retaining members in said tightening direction is high enough to require said tool to tighten said nut when said fourth and fifth rotational retaining members are fully engaged, and a resistance between said fourth and fifth rotational retaining members in said loosening direction is at least three times said resistance in said tightening direction, said collar is a stamping from a plate, said collar thereby having a generally uniform thickness, said collar comprises a bent portion extending longitudinally toward said retaining ring, an inner surface of said bent portion encompassing an outer circumference of said retaining ring, wherein said third rotational retaining member is disposed along said bent portion and said second rotational retaining member of said retaining ring is disposed along an outer surface thereof, an inner surface of said bent portion encompasses said entire outer circumference of said retaining ring, wherein no portion of said retaining ring extends out from said inner surface of said bent portion, and said first rotational retaining member is a tab engageable with a slot in said shaft.

* * * * *